US010339491B2

(12) United States Patent
Wakim et al.

(10) Patent No.: US 10,339,491 B2
(45) Date of Patent: Jul. 2, 2019

(54) MOBILE PICKUP UNITS

(71) Applicant: Amazon Technologies, Inc., Seattle, WA (US)

(72) Inventors: Peter Anthony Wakim, Seattle, WA (US); Jared Molton, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 370 days.

(21) Appl. No.: 15/152,204

(22) Filed: May 11, 2016

(65) Prior Publication Data

US 2017/0330144 A1    Nov. 16, 2017

(51) Int. Cl.
*G06Q 10/08*    (2012.01)
*G01C 21/34*    (2006.01)
*H04W 4/02*    (2018.01)

(52) U.S. Cl.
CPC .......... *G06Q 10/0833* (2013.01); *G01C 21/34* (2013.01); *G01C 21/3438* (2013.01); *G06Q 10/083* (2013.01); *G06Q 10/0836* (2013.01); *G06Q 10/08355* (2013.01); *H04W 4/023* (2013.01)

(58) Field of Classification Search
CPC .............. G06Q 10/0833; G06Q 10/08; G06Q 10/083; G06Q 10/0831; G06Q 10/0832; G06Q 10/0834; G06Q 10/08345; G06Q 10/0835; G06Q 10/08355; G06Q 10/0836; G06Q 10/0837
USPC ........................................................ 705/333
See application file for complete search history.

(56) References Cited

U.S. PATENT DOCUMENTS

| 4,865,248 | A  | 9/1989 | Barth |
| 5,386,462 | A  | 1/1995 | Schlamp |
| 6,344,796 | B1 | 2/2002 | Ogilvie et al. |
| 6,426,699 | B1 | 7/2002 | Porter |
| 6,690,997 | B2 | 2/2004 | Rivalto |
| 6,694,217 | B2 | 2/2004 | Bloom |
| 6,919,803 | B2 | 7/2005 | Breed |

(Continued)

OTHER PUBLICATIONS

Brian Coltin, Manuela Veloso, Online Pickup and Delivery Planning with Transfers for Mobile Robots, 2013, Association for the Advancement of Artificial Intelligence (Year: 2013).*

(Continued)

*Primary Examiner* — Kevin H Flynn
*Assistant Examiner* — Dione N. Simpson
(74) *Attorney, Agent, or Firm* — Athorus, PLLC

(57) ABSTRACT

A mobile pickup unit is provided that includes storage compartments (e.g., for containing items) and is configured to travel to a user pickup area and park as close as possible to an optimal location that is determined based on the locations of users who are scheduled to utilize the mobile pickup unit. The mobile pickup unit may include or otherwise be transported by any type of mobile machine (e.g., automobile, etc.), and control of the mobile machine may be manual (e.g., a driver) or automated (e.g., directly or remotely controlled by an automated system, robotic, etc.) A parking location that is selected may be along a public street or any other available parking space, such that parking locations may be selected on a daily basis that are convenient for the users who will be utilizing the mobile pickup unit (e.g., for retrieving ordered items, dropping off returned items, etc.).

20 Claims, 15 Drawing Sheets

(56) References Cited

U.S. PATENT DOCUMENTS

| | | |
|---|---|---|
| 6,961,711 B1 | 11/2005 | Chee |
| 6,970,838 B1 | 11/2005 | Kamath et al. |
| 7,129,817 B2 | 10/2006 | Yamagishi |
| 7,133,743 B2 | 11/2006 | Tilles et al. |
| 7,188,513 B2 | 3/2007 | Wilson |
| 7,337,686 B2 | 3/2008 | Sagi-Dolev |
| 7,337,944 B2 | 3/2008 | Devar |
| 7,693,745 B1 | 4/2010 | Pomerantz et al. |
| 7,925,375 B2 | 4/2011 | Schininger et al. |
| 8,078,317 B2 | 12/2011 | Allinson et al. |
| 8,145,351 B2 | 3/2012 | Schininger et al. |
| 8,195,328 B2 | 6/2012 | Mallett et al. |
| 9,983,020 B2* | 5/2018 | Sakuma ............ G01C 21/3617 |
| 2001/0045449 A1 | 11/2001 | Shannon |
| 2002/0116289 A1 | 8/2002 | Yang |
| 2007/0073552 A1 | 3/2007 | Hileman |
| 2007/0150375 A1* | 6/2007 | Yang ..................... G06Q 10/08 705/339 |
| 2007/0170237 A1 | 7/2007 | Neff |
| 2009/0063166 A1 | 3/2009 | Palmer |
| 2009/0106124 A1 | 4/2009 | Yang |
| 2012/0039694 A1 | 2/2012 | Suzanne |
| 2012/0109419 A1 | 5/2012 | Mercado |
| 2013/0261792 A1 | 10/2013 | Gupta et al. |
| 2013/0262251 A1 | 10/2013 | Wan et al. |
| 2013/0262276 A1 | 10/2013 | Wan et al. |
| 2014/0052661 A1 | 2/2014 | Shakes et al. |
| 2014/0180914 A1* | 6/2014 | Abhyanker ............ G01C 1/00 705/39 |
| 2015/0006005 A1* | 1/2015 | Yu ......................... G06Q 10/08 701/22 |
| 2015/0227882 A1 | 8/2015 | Bhatt |

OTHER PUBLICATIONS

Michel Gendreau, Francois Guertin, Jean-Yves Potvin, Rene' Seguin; Neighborhood search heuristics for a dynamic vehicle dispatching problem with pick-ups and deliveries, 2006, Science Direct (Year: 2006).*

Anonymous: "Autonomous car—Wikipedia", May 10, 2016, XP055386528, Retrieved from the Internet: URL:https://en.wikipedia.org/w/index.php?title=Autonomous_car&oldid=719591145 [retrieved on Jun. 29, 2017].

International Search Report and Written Opinion for PCT Application No. PCT/US2017/031617 dated Jul. 11, 2017.

* cited by examiner

MOBILE PICKUP UNITS

BACKGROUND

Many companies package items and/or groups of items together for a variety of purposes, such as e-commerce and mail-order companies that package items (e.g., books, CDs, apparel, food, etc.) to be shipped to fulfill orders from customers. Retailers, wholesalers, and other product distributors (which may collectively be referred to as distributors) typically maintain an inventory of various items that may be ordered by customers. This inventory may be maintained and processed at a building including a materials handling facility. Such materials handling facilities may include, but are not limited to, one or more of: warehouses, distribution centers, cross-docking facilities, order fulfillment facilities, packaging facilities, shipping facilities, or other facilities or combinations of facilities for performing one or more functions of material (inventory) handling.

Typically ordered items are packed in shipping packages (e.g., corrugated boxes) and shipped to the customer's residence or place of business. Alternatively, a customer may order an item and designate a pickup location as the delivery location. A pickup location may include a structure with a control station and storage compartments where the items that are ordered from a materials handling facility can be delivered for pickup by customers. Rather than shipping the item to a residence or place of business, the item may be shipped to the pickup location and stored in a storage compartment for retrieval by the customer. However, some customers may not live or work near a pickup location and/or various costs may be incurred for the shipment and delivery of the items to the pickup location.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
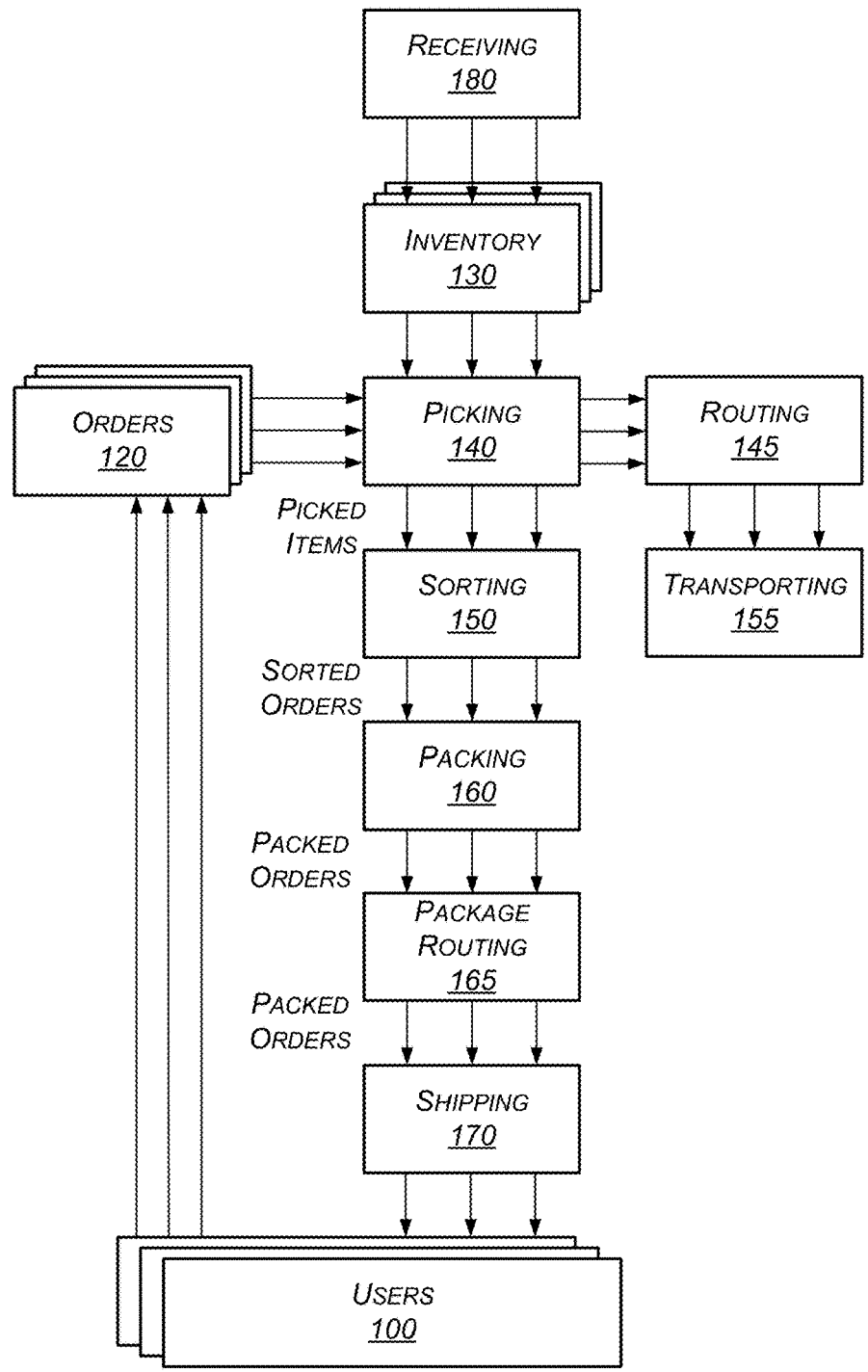
FIG. 1 illustrates a broad view of the operation of a materials handling facility, according to some implementations.

While implementations are described herein by way of example, those skilled in the art will recognize that the implementations are not limited to the examples or drawings described. It should be understood that the drawings and detailed description thereof are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to."

DETAILED DESCRIPTION

This disclosure describes systems and methods for utilizing mobile pickup units. In various implementations, a mobile pickup unit that contains ordered items is parked as close as possible to an optimal location that is determined relative to the locations of users who ordered the items. The users are then able to conveniently travel to the mobile pickup unit to retrieve the ordered items. In various implementations, the parking location may be along a public street or any other type of space where a mobile pickup unit may be temporarily parked. In this manner, parking locations may be selected on a daily basis that are convenient for the users, and a need for reserved parking spaces at fixed locations (e.g., which on a given day may be less convenient for the users, may take up space in a busy area, may be expensive, etc.) is reduced.

In various implementations, a mobile pickup unit may include or be transported by any type of mobile machine, such as a car, truck, watercraft, aircraft, unmanned aerial vehicle, mobile drive unit, automated mobile vehicle, other mobile machine, etc. The control of the mobile machine may be manual (e.g., a driver) or automated (e.g., directly or remotely controlled by an automated system, robotic, etc.) In an implementation where the control is automated, a navigation system may be utilized for navigating the mobile pickup unit to a user pickup area, searching for an available parking location, etc.

In various implementations, a location where a mobile pickup unit may be parked may be in a user pickup area that is within a specified travel limit (e.g., as defined by travel distance, time, etc.) for each of the users. For example, as part of an ordering process, travel-related data may be received and/or determined which indicates maximum travel distance or time that a user will be required to travel to reach a mobile pickup unit. In one implementation, a mobile pickup unit may be designated to be parked no more than a given travel distance (e.g., 0.25 miles) or travel time (e.g., 5 minutes) from the user's preferred delivery address (or other user location that is specified by the user). In various implementations, such maximum travel distances, times, etc. may be designated by a central management system and/or selected by the individual users, etc.

In various implementations, a user travel area for each user may correspond to a travel limit as indicated by the travel-related data that is received and/or determined. For example, in accordance with a maximum travel distance of 0.25 miles, a user travel area may be defined as a circle with a 0.25 mile radius. Once the user travel areas have been determined, a user pickup area may be determined in accordance with an area where the user travel areas overlap. The user pickup area may thus be within the travel limits relative to each of the user locations. In an alternative implementation, a user pickup area may generally be predetermined, and may be based on an area that is expected (e.g., based on statistics regarding user orders in a given region, etc.) to be within the travel limits of various users who may place orders.

In various implementations, after a mobile pickup unit is filled with ordered items (e.g., at a materials handling facility), the mobile pickup unit may travel along a travel path to a user pickup area. Once the mobile pickup unit has arrived at the user pickup area, a search may begin for an available parking location. In various implementations, various techniques may be utilized for searching for an available parking location. For example, a mobile pickup unit may be instructed to travel to a preferred location (e.g., an optimal location) that has been determined (e.g., as being at a center or centroid of a user pickup area, or according to an average of the coordinates of the user locations, etc.) and to begin a search for an available parking location that is as close as possible to the preferred location. In various implementations, the search instructions may include following a particular pattern (e.g., a spiral pattern outward, etc.), which may depend in part on the timing for finding the parking location. For example, if a mobile pickup unit is to be parked by a particular time (e.g., 3:00 p.m.) but has arrived in a user pickup area early (e.g., 30 minutes early), the search instructions may include circling the area near the preferred location for a period of time before beginning a more aggressive search pattern to look for parking locations that may be further away from the preferred location. As another example, a mobile pickup unit may alternatively be directed to park in a first available parking location within a user pickup area (e.g., if there is only limited time remaining for finding a parking location). In various implementations, other data may also be received and utilized for assisting with the search for a parking location (e.g., images and/or data from satellites, street cameras, other vehicles travelling in the area, etc.).

Once an available parking location is found, a determination is made if the parking location meets certain criteria. In various implementations, the criteria may be based at least in part on the amount of time that the mobile pickup unit will be required to park for. For example, if a mobile pickup unit will be required to park from 3:00 p.m. to 8:00 p.m., the criteria may require that the mobile pickup unit be able to park for that time period. In various implementations, certain sensors of the mobile pickup unit may be utilized to read parking signs or otherwise obtain information regarding a parking location (e.g., for determining maximum parking time limits, etc.). In some implementations, some parking locations that are located throughout a region may be reserved for use by the mobile pickup units and/or other commercial vehicles (e.g., during certain times of day, etc.) In some instances, a mobile pickup unit may park in a first parking location during a first portion of a time period, and then may move to a second parking location during a second portion of a time period (e.g., if no parking locations are currently available for the full time period).

In various implementations, an orientation in which a mobile pickup unit is parked may depend on various factors. For example, if the mobile pickup unit and/or included storage compartments only have access points for users on one side of the mobile pickup unit, it may be desirable for the accessible side of the mobile pickup unit to be facing a sidewalk or other area where a user may safely stand, has room, etc. to retrieve an ordered item. In alternative implementations, a mobile pickup unit may provide access for users on multiple sides of the mobile pickup unit (e.g., storage compartments with doors on both sides of the mobile pickup unit, etc.) which may allow greater flexibility for the parking orientation of the mobile pickup unit. The mobile pickup unit may also have an ability to partially or fully rotate at least a portion of the mobile pickup unit (e.g., over a parked base), so as to present an access point in a desired direction regardless of how the mobile pickup unit is initially parked. In another example, a mechanism (e.g., a robotic arm) may be provided that is able to present an item to a user on different sides of the mobile pickup unit.

Once a mobile pickup unit is parked, notifications regarding the parking location may be sent. In various implementations, such notifications may be sent to a remote computing resource (e.g., a central management system), or directly to users, etc. A notification that is sent to a user (e.g., from a central management system or directly from the mobile pickup unit) may include information to assist the user with finding the mobile pickup unit at the parking location. For example, the coordinates (e.g., GPS coordinates, etc.) of the parking location may be provided, and/or other types of relevant data or directions may be provided (e.g., which may in some instances enable a user to easily view or track the current location of the mobile pickup unit on a screen of a user device, etc.). In one implementation, turn-by-turn directions may be provided for reaching the parking location which may include cross streets and/or one or more addresses that are close to the parking location, etc.

In various implementations, a mobile pickup unit may also include a locator device that is configured to assist a user with finding the mobile pickup unit. For example, the locator device may wirelessly transmit an electronic signal that enables the position of the mobile pickup unit to be tracked and/or otherwise determined (e.g., as indicated on a screen of a mobile electronic device carried by a user, etc.). As another example, the locator device may emit various sounds, activate lights, etc. (e.g., when a user is determined to be nearby) to assist a user with finding the mobile pickup unit.

In various implementations, after ordered items have been retrieved by some users from a mobile pickup unit, a determination may be made to relocate the mobile pickup unit to be closer to the remaining users who have not yet retrieved their ordered items. For example, at the end of a time window (e.g., 3:00 p.m. to 8:00 p.m.), or otherwise after a certain period of time, a determination may be made as to which ordered items have not yet been retrieved by users from the mobile pickup unit. Once the remaining ordered items have been determined, the mobile pickup unit may be relocated to be closer to the remaining users. As part of the relocation process, various types of notifications may be sent. For example, a notification from the mobile pickup unit (e.g., as sent to a central management system and/or directly to a user, etc.) may indicate that the mobile pickup unit is being relocated to be closer to the remaining users. After the mobile pickup unit has parked at a new parking location, notifications may also be sent (e.g., from a central management system or directly from the mobile pickup unit) to users to indicate the new parking location.

In various implementations, a mobile pickup unit may also be utilized for returns of items by users. For example, a user may place an item that is to be returned into one of the storage compartments, or into a storage compartment module configured as a drop-box for returns. A user may also indicate that they will not be retrieving an ordered item from a storage compartment of the mobile pickup unit, and that they wish to instead have the item returned. In some instances, a refund or replacement process may be initiated when an item is received or left at the mobile pickup unit for a return. When the mobile pickup unit travels back to the materials handling facility, the returned item may be removed from the storage compartment and further processed for the return.

As used herein, a "materials handling facility" may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. A "delivery location," as used herein, refers to any location at which one or more inventory items may be delivered. Inventory or items may be any physical goods that can be transported using a mobile pickup unit.

A block diagram of a materials handling facility which, in one implementation, may be an order fulfillment facility configured to utilize various systems and methods described herein, is illustrated in FIG. 1. In this example, multiple users 100 may submit orders 120, where each order 120 specifies one or more items from inventory 130 to be shipped or otherwise delivered to the user or to another entity (e.g., another user) specified in the order. An order fulfillment facility typically includes a receiving operation 180 for receiving shipments of stock from various vendors and storing the received stock in inventory 130. To fulfill the orders 120, the item(s) specified in each order may be retrieved or "picked" from inventory 130 (which may also be referred to as stock storage) in the order fulfillment facility, as indicated by picking operation 140. The picking operation 140 may in various implementations be manual or automated (e.g., robotic). In some implementations, the items of a user order may be divided into multiple shipment sets for fulfillment by a planning service before fulfillment instructions are generated (not shown). As used herein, the term "shipment set" may refer to a single item of a user's order, multiple items of a user's order, or all items of a user's order.

In some instances, when users have selected to retrieve ordered items from a mobile pickup unit, such as the mobile pickup unit described below with respect to FIG. 2, the item(s) of one or more shipment sets may be picked at the picking operation 140 directly into storage compartments of the mobile pickup unit. It will be appreciated that by picking items directly into the storage compartments of the mobile pickup unit, the items may not need to be packed in shipping packages. In addition, the packing slip typically included in a shipping package may be applied to the item (e.g., stickered to the item), printed out at the mobile pickup unit upon retrieval of the item, or otherwise made available to a user.

In various implementations, the storage compartments of the mobile pickup unit may each include a unique identifier, such as a bar code, QR code, unique number, etc., to enable tracking, identification, and/or association of items placed in each of the storage compartments. For example, during a picking operation, an agent or automated system (e.g., robotic) within the materials handling facility may scan the bar code of the storage compartment and/or scan a bar code or identifier of the picked item as the item is picked and/or placed into the storage compartment. Scanning of the storage compartment and/or the picked item may be utilized to associate and track the item with the storage compartment and the mobile pickup unit. As mobile pickup units are filled, a routing operation 145 may route the filled mobile pickup units to an appropriate transporting operation 155 for travelling to a designated user pickup area, as will be described in more detail below with respect to FIG. 10.

In other examples, when a user has selected to retrieve an item from a mobile pickup unit, but the mobile pickup unit is not at the materials handling facility and/or has already left the materials handling facility and traveled to a user pickup area, the item(s) of one or more shipment sets may be picked at the picking operation 140 directly into delivery containers for being delivered to the mobile pickup unit. A "delivery container," as used herein, may be any form of container used in transporting or handling items. For example, a delivery container may be a tote, pallet, bin, trailer, etc. Additionally, the delivery container may be segmented or otherwise include division points, permanent or movable, that enable separation of items within the delivery container. In some instances, items themselves, such as larger items (e.g., big screen televisions, desks, cabinets) may be considered and treated as delivery containers.

The delivery container may also include a unique identifier, such as a bar code, QR code, unique number, etc., to enable tracking and identification of the delivery container and association of items placed into the delivery container. For example, during a picking operation, an agent within the materials handling facility may scan the bar code of the delivery container and scan a bar code or identifier of the picked item as the item is placed into the delivery container. Scanning of the delivery container and the picked item results in the item becoming associated with and tracked with the delivery container. In some implementations, for delivery containers that are segmented or otherwise include division points, those segments may each include a unique identifier (e.g., bar code) and as items are placed in the delivery container they may be associated with a specific location, or segment within the delivery container by scanning the identifier of that segment. Likewise, because items may not be packed in shipping packages, the packing slip typically included in a shipping package may be applied to the item (e.g., stickered to the item), printed out at the mobile pickup unit upon retrieval of the item, or otherwise made available to a user.

Regardless of the type of delivery container utilized, in some implementations, items that are to be delivered to a mobile pickup unit may not need to be packed in a shipping package and can be transported to the mobile pickup unit in the delivery container. In other instances, items that are pre-packaged or fragile items that need additional protection prior to transport may be picked and transported to a mobile pickup unit in a delivery container. In another implementation, items may be put into bags prior to placement in the delivery container and/or storage compartment to provide confidentiality of the ordered items. In addition, items from multiple shipment sets destined for the same mobile pickup unit may be picked into the same delivery container for transport. As delivery containers are filled, a routing operation 145 may route the filled delivery containers to the appropriate transporting operation 155 for transport to the designated mobile pickup unit. The routing operation 145 may be manual or automated. The routing operation 145 may receive an indication of the mobile pickup unit to which each item should be routed from a shipment planning system and route delivery containers to one of two or more transporting operations 155, from which they may be transported to the mobile pickup unit.

In other examples, for items not scheduled for delivery without a shipping package to a mobile pickup unit, picked items may be delivered to one or more stations in the order fulfillment facility for sorting 150 into their respective shipment sets and for packing 160 in shipping packages. A package routing operation 165 may sort orders for packing in shipping packages to one of two or more shipping operations 170, from which they may be shipped to the users 100. The package routing operation 165 may in various implementations be automated or manual. The package routing operation 165 may receive an indication of the destination to which each packed shipment set should be routed from a central control system. In some instances, the destination may be a final destination identified by the user or a mobile pickup unit, etc. The package routing operation 165 may also determine a routing destination for each packed shipment set dependent on the size of a shipping package in which the shipment set is contained and/or based on whether the shipment set will be delivered directly to the user or be delivered to a mobile pickup unit.

The arrangement and order of operations illustrated by FIG. 1 is merely one example of many possible implementations of the operation of a materials handling facility, such as an order fulfillment facility, that enables filling of mobile pickup units with items and transport to user pickup areas (FIG. 8) and/or other fulfillment of user orders. Other types of materials handling, manufacturing, or order fulfillment facilities may include different, fewer, or additional operations and resources, according to different implementations.

Figure 2:
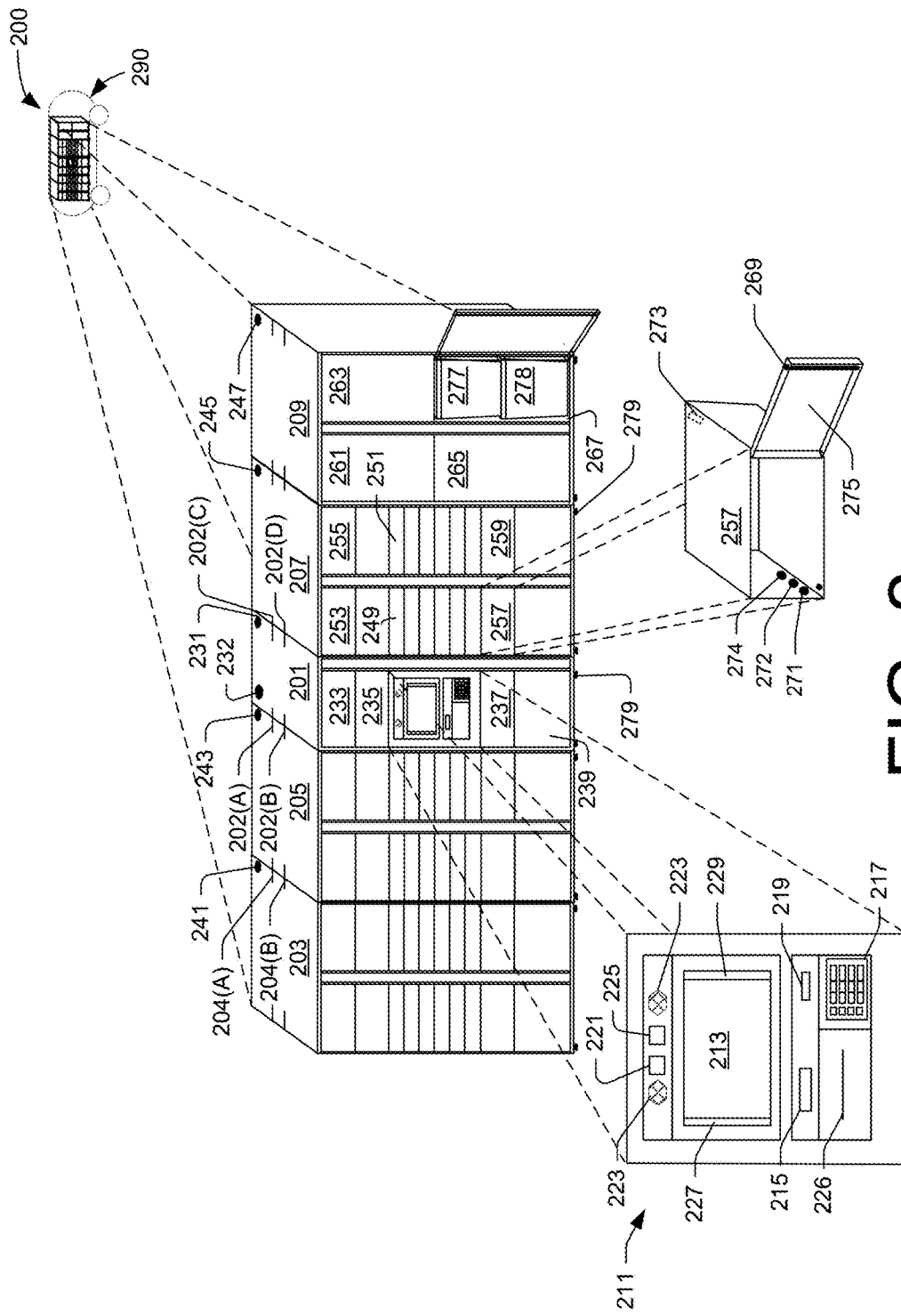
FIG. 2 depicts a block diagram of a mobile pickup unit, according to some implementations.

FIG. 2 depicts a block diagram of a mobile pickup unit 200. In various implementations, the mobile pickup unit 200 may include or be transported by any type of mobile machine 290, such as trucks, cars, watercraft, aircraft, unmanned aerial vehicles, mobile drive units, automated mobile vehicles, other mobile machines, etc. The control of the mobile machines 290 may be manual (e.g., a driver) or automated (e.g., directly or remotely controlled by an automated system, robotic, etc.).

The size of the mobile pickup unit 200 may vary, and while for purposes of illustration the example of FIG. 2 includes several sections of storage compartments, fewer and/or smaller storage compartments and/or features may be included depending on the specific implementation. The shape of the mobile pickup unit 200 may also vary, depending on the implementation. For example, the mobile pickup unit may be sized and shaped so as to fit in a standard parking space on a public street. The profile of the mobile pickup unit 200 may also be streamlined so as to reduce air resistance while travelling. Weatherproofing techniques may be utilized to protect the functionality of the mobile pickup unit 200 when it is subjected to weather conditions while travelling or while at a user pickup area, etc.

Figure 4:
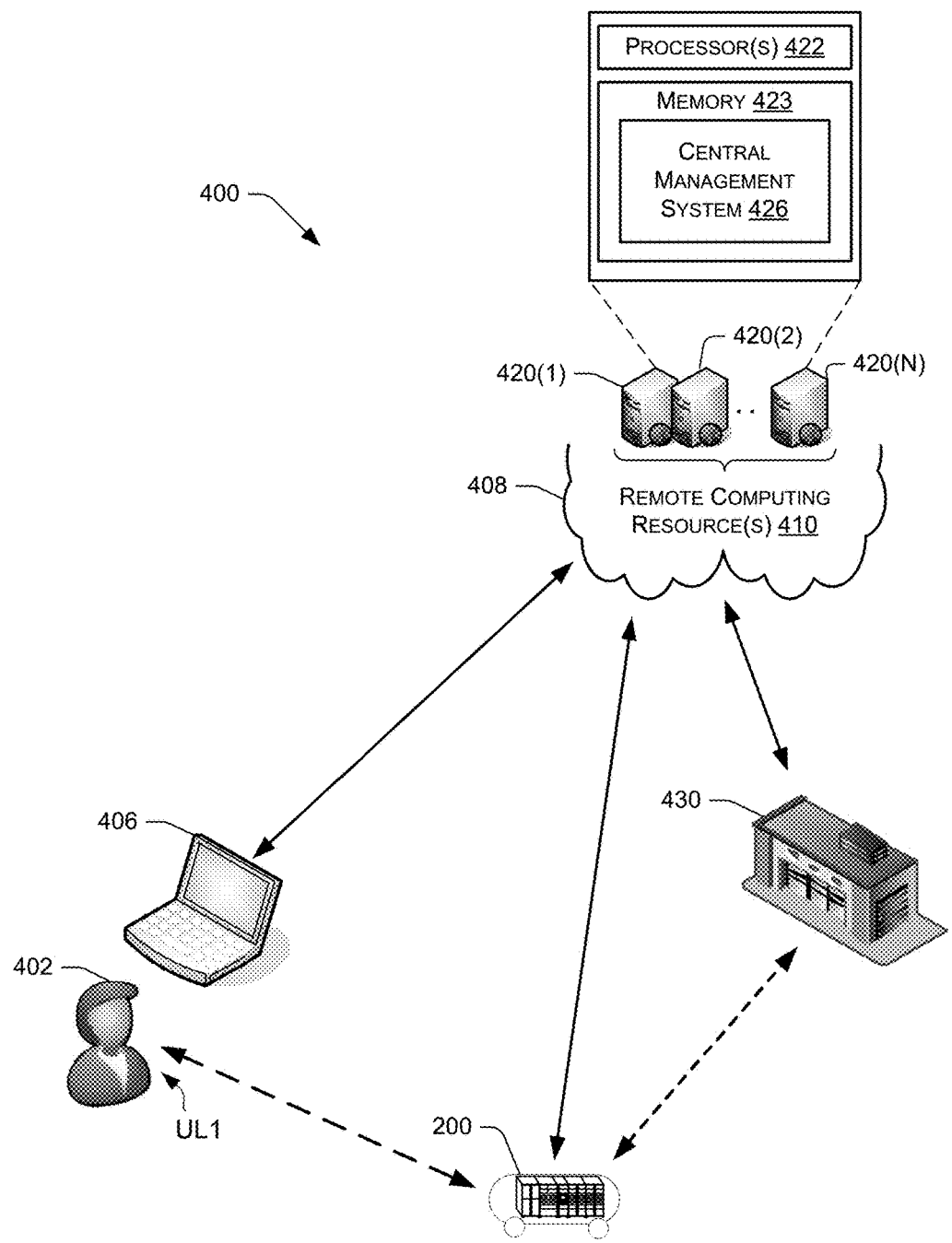
FIG. 4 depicts a block diagram of a mobile pickup unit environment, according to some implementations.

The mobile pickup unit 200 may include one or more control stations 201 and one or more storage compartment modules 203, 205, 207, 209. The control station 201 acts as the central control point for the mobile pickup unit 200, providing power, computing resources, user input and network access to the mobile pickup unit 200. For example, the control station 201 may include an internal computing system (not shown), such as a computing system described below with respect to FIG. 14, or other computing system, that is capable of maintaining system information for each storage compartment at the mobile pickup unit 200 and providing other computing functions. For example, the internal computing system may include a command component that maintains information as to which storage compartments of the mobile pickup unit 200 are empty, which storage compartments include items, the access code(s) or other identifier(s) necessary to open each of the storage compartments and any other information necessary to maintain the mobile pickup unit. The command component may also issue commands or instructions to the storage compartment modules to lock/unlock storage compartments, activate sensors, and the like. The mobile pickup unit 200 may be configured to obtain information from a remote computing resource, shipment planning system, capacity planning system or materials handling facility or may be configured to operate primarily as a stand-alone unit, with limited external communication to provide capacity information and/or to receive/provide order/delivery/transfer information. FIG. 4, described below, illustrates an example of an environment in which a central management system is provided for remotely communicating with a mobile pickup unit 200 as part of a system for transporting ordered items for retrieval by users.

The control station 201 may also include a user interface 211. The user interface 211 is configured to receive and provide information to one or more users of the mobile pickup unit 200 and may include, but is not limited to, a display 213, such as a touch-screen display, a scanner 215, a keypad 217, a biometric scanner 219, an audio transducer 221, one or more speakers 223, one or more image capture devices 225, such as a video camera, and any other types of input or output devices that may support interaction between the mobile pickup unit 200 and one or more users. For example, the user interface 211 may also include a credit card reader, the ability to accept money (such as cash or coins) and/or the ability to vend items (e.g., stamps, labels, envelopes, shipping packages) using a vending slot 226. Providing the ability for the mobile pickup unit 200 to accept credit cards and/or money enables an item in a storage compartment of the mobile pickup unit 200 to be paid for at the time of pickup (e.g., cash on delivery). Likewise enabling vending of items, such as stamps or envelopes, supports the ability for users to utilize a mobile pickup unit to ship or deliver goods, as described in more detail below.

In addition to including user input and output devices, the user interface 211 may also include the ability to collect particulates, such as for use in detection of hazardous (e.g., explosives) or banned substances (e.g., drugs). In one implementation, the user interface 211 may include a particulate sensor that includes a forced air ejection component 227 and an air intake component 229. The air ejection component expels air from a left side of the display 213 while a user is interacting with or otherwise within a predetermined range of the display 213. Opposite the air ejection component 227, the air intake component 229 collects the ejected air and any particulates that are collected as the air passes over the display 213 and past the user's hand or fingers as they interact with the display 213. Collected particulates may be scanned or otherwise processed to determine if potentially hazardous or banned substances may be placed into a storage compartment using any known particulate testing technique. If particulates indicating the potential presence of hazardous or banned substances are detected, the control station 201 may determine to not open a storage compartment door, may alert the authorities, or take other protective actions (such as shutting down the mobile pickup unit or performing additional tests). For example, if the air intake component 229 detects gasoline vapor particulates in a mobile pickup unit, the control station 201 may contact the appropriate authorities (e.g., police, fire, etc.).

In certain smaller implementations for a mobile pickup unit 200, the user interface 211 may include more limited features. For example, in one implementation the user interface 211 may include a relatively small display 213 with only a keypad 217 for providing input. In certain other implementations, these and other features may also be eliminated, wherein control of the mobile pickup unit 200 may primarily be provided remotely. For example, in order to access a storage compartment, a user may send or reply to a text message to or from a centralized remotely located control system (e.g., a central management system), which controls the mobile pickup unit 200 to open the storage compartment door so that the user can retrieve the ordered item.

The control station 201 may include a connector component configured to provide wired and/or wireless network connectivity with the other storage compartment modules 203, 205, 207, 209, as well as to remote computing resources (FIG. 4) or materials handling facilities. Wireless connectivity may be implemented using a wireless antenna 231, which may provide both receive and transmit functionality. Power and/or network communication with remote computing devices may be obtained from a main access point 232. In addition, in some implementations, the control station 201 may include one or more storage compartments 233, 235, 237, 239. As described in more detail below with respect to the storage compartment modules 203, 205, 207, 209, the storage compartments 233, 235, 237, 239 of the control station 201 may be of any size or configuration. As with each of the other storage compartments, the storage compartments 233, 235, 237, 239 of the control station 201 may include an automated locking mechanism, image capture device, a motion or presence detection mechanism, temperature sensor, etc. Alternatively, in some implementations one or more of the storage compartments may be utilized as an additional user interface. For example, storage compartment 239 may be removed and the space remaining may be utilized to provide a scale or other type of weight determination component to allow users to weigh items for shipment, determine the cost necessary to ship the item, and pay for shipping using the user interface 211.

The control station 201 may include one or more connector components 202(A), 202(B), 202(C), 202(D) to which a storage compartment module, such as storage compartment module 205 or storage compartment module 207, may connect with the control station 201. For example, connector component 202(A) may provide power to storage compartment module 205, connector component 202(B) may provide communication with storage compartment module 205, connector component 202(C) may provide power to storage compartment module 207 and connector component 202(D) may provide communication with storage compartment module 207. Likewise, the storage compartment modules may also include one or more connector components, such as connector component 204(A), 204(B) to provide power and connectivity to additional storage compartment modules, such as storage compartment module 203.

Each storage compartment module, such as storage compartment modules 203, 205, 207, 209, may be configured so the mobile pickup unit 200 is modular, such that one or more storage compartment modules can be easily removed or added to the control station 201 of the mobile pickup unit 200. In general, in various implementations each of the storage compartment modules may individually or collectively include or be transported by any type of mobile machine, such as a truck, car, watercraft, aircraft, unmanned aerial vehicle, mobile drive unit, mobile vehicle, etc. The control of the mobile machines may be manual (e.g., a driver) or automated (e.g., directly or remotely controlled by an automated system, robotic, etc.). The ability to add or remove storage compartment modules to a mobile pickup unit 200 supports the ability to easily and quickly expand or remove capacity so that the demand for that mobile pickup unit can be satisfied. For example, during the Christmas holiday season, additional storage compartment modules may need to be added to the mobile pickup unit 200 to support the increased demand for items ordered by users. As storage compartment modules 203, 205, 207, 209 are added or removed from a mobile pickup unit 200, the control station 201 may inform the warehouse management system and/or a capacity planning system of the added or removed capacity.

Each storage compartment module 203, 205, 207, 209 includes one or more storage compartments, one or more receptor components for connecting with connector components of a control station 201 (or another storage compartment module) and one or more connector components for allowing other storage compartment modules to connect thereto, thereby providing power and/or connectivity with the control station 201. The storage compartments of each storage compartment module may be of varying sizes and number. As such, storage compartment modules with different storage compartment sizes can be added to a mobile pickup unit 200 to optimize the storage compartment configuration to match that of the sizes of items typically placed in the storage compartments of the mobile pickup unit 200.

Figure 14:
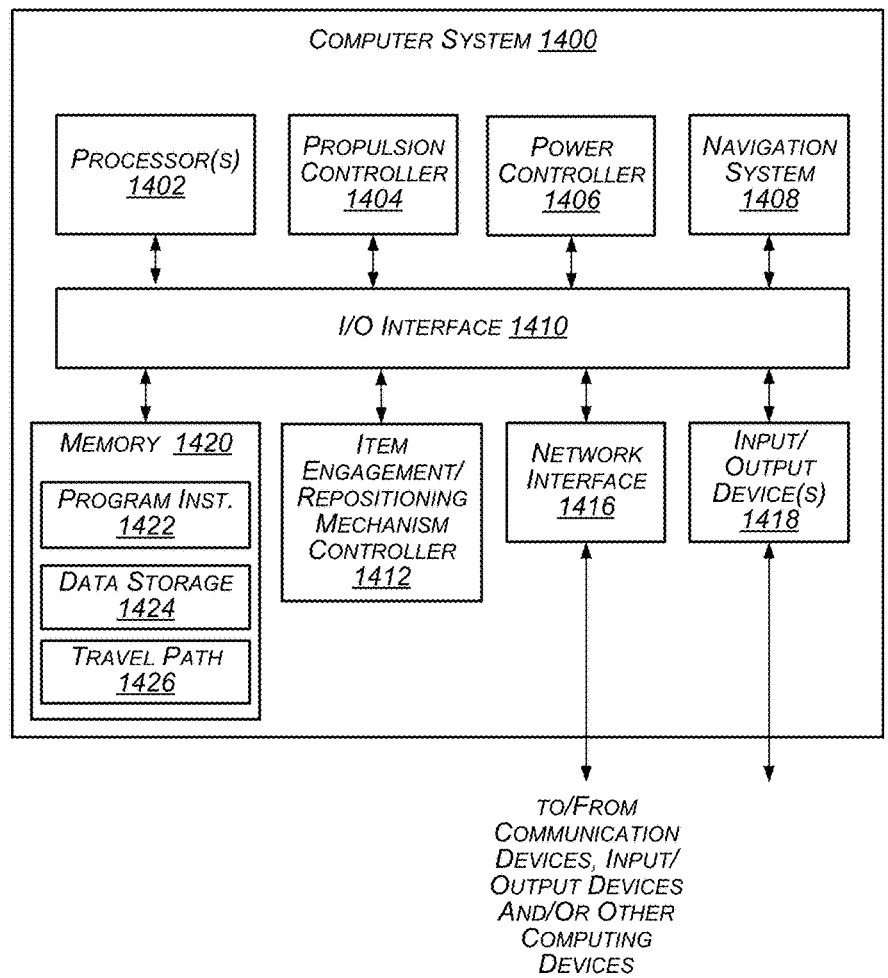
FIG. 14 is a block diagram illustrating an example computer system configured to implement one or more of the systems or processes described herein, according to some implementations.

In addition to including storage compartments, power and connectivity points, the storage compartment modules 203, 205, 207, 209 may also include one or more wireless antennas 241, 243, 245, 247 and one or more computing systems, such as the computing system described with respect to FIG. 14, or a simpler computing system such as a printed circuit board, RFID tag, or any other object or mechanism that may be detectable by the control station 201 and used to identify the storage compartment module. The computing component(s) of each storage compartment module may include a unique identifier of the storage compartment module and configuration information of the storage compartment module, which includes dimension information and location information of each storage compartment of the storage compartment module. The computing component may also include a storage compartment management component configured to control the actuators that enable locking and unlocking of the storage compartment doors of the storage compartment module 203, 205, 207, 209 in response to receiving commands or instructions from a command component of the control station 201.

A storage compartment module, such as storage compartment module 207, when added to a control station 201 and power is applied, provides information to the control station 201 identifying the storage compartment module 207, the number, location, and dimensions of each storage compartment of the storage compartment module and any other configuration or information necessary to enable the control station 201 to control the storage compartment module 207. As illustrated by the comparison between storage compartment module 207 and storage compartment module 209, each storage compartment module may have a variety of different configurations, sizes and numbers of storage compartments. For example, storage compartment module 207 includes a group of small storage compartments, such as small storage compartments 249, 251, a group of medium-sized storage compartments, such as medium-sized storage compartments 253, 255 and a group of larger storage compartments, such as larger storage compartments 257, 259. In contrast, storage compartment module 209 includes four very large storage compartments 261, 263, 265, 267. It will be appreciated that any number, size and configuration of storage compartments of a storage compartment module may be utilized with the various implementations described herein.

In an alternative implementation, rather than providing all of the information from the storage compartment module to the control station 201, the storage compartment module 207 may only provide limited information, such an identifier, to the control station 201. The control station 201, upon receiving the limited information from an added storage compartment module 207, may make a request to a remote computing system, such as a capacity planning system, and obtain information about the configuration, number and sizes of the storage compartments of the added storage compartment module 207.

The control station 201, upon receiving identifying information of an added storage compartment module 207, may allocate the added capacity to the mobile pickup unit 200, and may inform a remote computing resource such as will be described in more detail below with respect to FIG. 4. In various implementations, the added storage compartment module may act as a slave component for the control station, receiving instructions (e.g., open storage compartment, close storage compartment, activate image capture device, monitor motion sensor) from the command component of the control station 201 and providing responses (e.g., closed-door, open-door, object/movement detected) to the control station 201 via the storage compartment management component.

Each storage compartment of a storage compartment module 203, 205, 207, 209 or control station 201 includes an upper, bottom, side and rear surfaces and at least one door configured to form a cavity in which items may be stored. In addition, each storage compartment may include various security or other components. For example, looking at the expanded view of storage compartment 257, disposed within the cavity the storage compartment may include a locking mechanism 269, which may be controlled remotely by the command component of the control station 201 via the storage compartment management component, a presence detection sensor 271, a motion sensor 272, an image capture device 273, a temperature sensor 274, and a mirror (or other reflective surface) on the top inside of the storage compartment unit (not shown).

The locking mechanism 269 may be controlled by the control station 201, either through wired or wireless communication with the storage compartment management component, to effect locking and unlocking of the door 275 of the storage compartment 257. For example, when a user interacts with the control station 201 via the display 213 and provides an access code or other identifier, the control station 201 may identify a specific storage compartment associated with the access code or other identifier and the command component may wirelessly send instructions to the storage compartment management component of the storage compartment module 207 to unlock a storage compartment 257. The instructions may include a command (e.g., unlock), an address or identifier of the specific storage compartment and any other information necessary for communication between the control station 201 and the storage compartment module 207. In response to receiving the instructions from the command component, the storage compartment management component of the storage compartment module 207 may activate a locking mechanism that moves the pins of the locking mechanism 269 on the door 275 of the identified storage compartment 257 such that the pins retract, thereby disengaging the lock of the storage compartment 257 allowing the door 275 to open. In some implementations, the storage compartment 257 may also include a spring mechanism (not shown) such that when the locking mechanism 269 of the storage compartment 257 is disengaged, the spring mechanism propels the door 275 outward, thereby identifying to a user that the door 275 is unlocked and the storage compartment 257 is accessible.

While the locking mechanism described above utilizes retractable pins, any mechanical, magnetic, electrical or other form of locking mechanism may be utilized with the various implementations described herein. In addition, the storage compartment 257 may also include magnets to help retrieve and close a door when it is not all the way closed. Also, the locking mechanism of different storage compartments and different storage compartment modules may be the same or different. Moreover, while the above example describes sending instructions from the command component of the control station 201 to the storage compartment management component of the storage compartment module, in other implementations, each storage compartment may be controlled and/or communicated with directly by the control station 201 and/or the command component and/or remote computing resources as will be described in more detail below with respect to FIG. 4.

The presence detection sensor 271 may be used to detect the presence or absence of objects in the storage compartment 257. For example, the presence detection sensor 271 may be utilized when an agent, carrier, user, or automated system (e.g., robotic) is placing items, delivery containers and/or transfer containers in the storage compartment 257 to confirm that the item is indeed in the storage compartment 257 before the door 275 is closed and locked by the locking mechanism 269. Additionally, the presence detection sensor 271 and/or motion sensor 272 may also be used when a user is picking up an item stored in the storage compartment 257 or when a carrier is adding or removing an item, delivery container and/or transfer container from the storage compartment 257. For example, when a user interacts with the control station 201 via the touch control display 213 and provides an access code such that a storage compartment 257 is opened, the presence detection sensor 271 and/or motion sensor 272 may be used to confirm that a user has reached into the storage compartment 257 and removed its contents (or added items in the case of returns or shipping), prior to allowing the storage compartment door 275 to be closed and locked with the locking mechanism 269. In some implementations, there may be multiple presence detection sensors 271 and/or motion sensors 272 distributed throughout the inside of a storage compartment to ensure objects/motion is detected. In still another implementation, the bottom of the storage compartment may include protrusions or rises to position thin items so they are detected by the presence detection sensor 271.

The storage compartments, such as storage compartment 257, may also include an image capture device 273, such as a camera, and optionally an illumination component (not shown), such as a light emitting diode (LED), that may be used to illuminate the inside of the storage compartment 257. The image capture device 273 may also be used to detect the presence or absence of items within the storage compartment 257, detect the item itself, for example to simplify returns, as well as for security. For example, the image capture device 273 may be used to identify the type of object located within the storage compartment 257 and/or to identify or record video/images of access within the storage compartment 257. In addition, the image capture device 273 may be used to determine the amount of space available in the storage compartment 257. For example, an image taken by the image capture device 273 may be transmitted via wired or wireless communication to the control station 201 and the control station 201 may determine the amount of space available in the storage compartment 257. Such information may be used to determine if all items of a shipment set will fit in a single storage compartment 257, if all items associated with a storage compartment are present in the storage compartment, or if the shipment set needs to be divided across multiple storage compartments. In addition, the image capture device 273 may also be used to determine if there is sufficient space in a storage compartment 267 to contain a delivery container 277 and/or transfer container 278.

Some storage compartments, such as storage compartments located vertically higher within a storage compartment module 203, 205, 207, 209 or the control station 201, such as storage compartments 233, 235, 253, 255, may also include a reflective surface, such as a mirror, on the inside top, sides and/or back of the storage compartment to enable a user who cannot see directly into the storage compartment to determine via a reflection off the reflective surface whether they have removed all of the items from the storage compartment. In a similar manner, a reflective surface may be included on the bottom, sides or back of a storage compartment, such as storage compartment 239, located lower within a storage compartment module 203, 205, 207, 209 or the control station 201, so users can determine via a reflection, and without having to bend all the way down to see into the storage compartment, whether all items have been removed.

The image capture device 273 may also be used to determine if all of the items have been removed from the storage compartment 257. For example, a current image taken by the image capture device 273 may be compared to a prior image taken when the storage compartment 257 was empty in order to verify that all of the items have been removed from the storage compartment. In one implementation, the current image taken by the image capture device 273 may be transmitted via wired or wireless communication to the control station 201 and the control station 201 may compare the current image to a stored image of the empty storage compartment 257 using image processing software to determine if all of the items have been removed. For example, when a user closes the door of the storage compartment 257 after removing some items, the control station 201 may use the current image from the image capture device 273 to automatically detect and provide a warning to the user if there are items remaining in the storage compartment 257.

Some storage compartments, such as any of the storage compartments located within a storage compartment module 203, 205, 207, 209 or the control station 201, may be refrigerated storage compartments. In various implementations, such refrigerated storage compartments may include their own cooling mechanisms, or may rely on those of neighboring refrigerated storage compartments to which they are environmentally coupled, or alternatively each of the modules 203, 205, 207, 209 or the entire mobile pickup unit 200 may have a centralized cooling system. The temperature of previously non-refrigerated storage compartments may be adjusted to become refrigerated storage compartments, and vice versa. The temperature in each of the refrigerated storage compartments may be separately adjustable, such that items inside each of the refrigerated storage compartments may be cooled to a desired temperature. For example, items that need to be chilled or frozen at specified temperatures, such as groceries or medical supplies, may be stored in various refrigerated storage compartments.

In various implementations, the temperatures in the refrigerated storage compartments may be adjusted when items are to be placed into the refrigerated storage compartments, or may be adjusted in advance. For example, when a refrigerated item is scheduled to be placed into a refrigerated storage compartment of a mobile pickup unit, the temperature of the refrigerated storage compartment may be adjusted to a temperature that is specified for the refrigerated item in advance so that the refrigerated storage compartment will already be at the specified temperature when the item is placed into the refrigerated storage compartment. In one implementation, the image capture device 273 may be used to capture an image of an item when it is delivered and/or placed into a storage compartment in order to try to determine an appropriate storage temperature for the item. For example, an item may have information on a label which identifies a storage temperature, such as "contents to be stored at 32 degrees F. or lower."

The temperatures in some or all of the refrigerated storage compartments may be controlled by the control station 201. Continuous monitoring and regulating of the temperatures of the refrigerated storage compartments in which such items are kept may be important for verifying the condition of the items. Temperature sensors, such as the temperature sensor 274 of the storage compartment 257, may be utilized for monitoring and regulating the temperature inside each of the refrigerated storage compartments. The refrigerated storage compartments and/or the entire mobile pickup unit 200 may be insulated to prevent the dissipation of the cooled air from the refrigerated storage compartments.

In various implementations, one or more of the refrigerated storage compartments may be insulated storage compartments which are cooled by passive cooling elements that are placed within the storage compartments. For example, rather than utilizing an active cooling system which may have components such as compressors and coils, some of the storage compartments may be cooled by passive cooling elements such as cold packs, frozen water bottles, etc. In one implementation, the passive cooling elements may be added to the storage compartment when the item is first placed into the storage compartment, such as at a materials handling facility or when a vendor places the item into the storage compartment. In another implementation, the passive cooling elements may be included in a shipping container with an item when it is shipped to the mobile pickup unit. In an alternative implementation, the passive cooling elements may already be at the mobile pickup unit and/or the designated user pickup area and may be added to the insulated storage compartment with the item when it arrives or is otherwise placed into the storage compartment.

In various implementations, the number of passive cooling elements to be included with an item may be calculated based on a number of factors. For example, one factor may be an estimated maximum period of time that the item may remain in the storage compartment before it is retrieved by a user. Another factor may be the expected ambient temperature at the mobile pickup unit and/or during shipping to the mobile pickup unit. Other factors may include the size of the storage compartment, the size and number of items to be included in the storage compartment, etc. Various government regulations may also specify temperatures at which certain items are to be maintained. For example, various federal, state and/or municipal regulations may dictate requirements for storage temperatures for items as well as maximum periods of time that items may be stored at a given temperature. All of these factors may be included in a calculation of how many passive cooling elements should be included in an insulated storage compartment with an item, as well as a determination of a maximum period of time that the item may remain in the storage compartment.

In some instances, a user may wish to return a refrigerated or other item. In one such instance, the item being returned may have never been retrieved by the user, in which case the control system for the storage compartment may verify that the user has never opened the storage compartment or taken possession of the item. In such a case, in some implementations, it may be assumed that the item is in the original unused condition such that it may be sold to another user as a new item. Such verifications may be particularly important for certain types of items. For example, for refrigerated items it may be important to be able to verify that they have been kept at a regulated temperature, for which any removal of the item from the storage compartment by a user may render the condition of the item uncertain.

In another instance, a user may have taken possession of an item by retrieving the item, but then decided to return the item to the mobile pickup unit, either to the original storage compartment or a different storage compartment. In the case of a return of an item, various techniques may be utilized to determine the presence and condition of the item. For example, a presence detection sensor 271, motion sensor 272, image capture device 273 and/or temperature sensor 274 within the storage compartment may all provide data regarding the presence and condition of the item. In one implementation, the image capture device 273 may be used to capture an image of an item when it is returned in order to try to identify the item and/or verify the item that has been returned. For example, an item may have a bar code or other information on a label which can be analyzed in an image in order to identify the item.

In another example, the mobile pickup unit 200 may also include a storage compartment module configured as a drop-box (not shown). Rather than utilizing specific storage compartments of the mobile pickup unit 200 to store returned items and/or items for delivery, a storage compartment module configured as a drop-box may be utilized to securely store such items. For example, a drop-box may be configured with a pivoting door or tray that allows items to be placed into the drop-box but not retrieved without having additional access to the drop-box. In some examples, the pivoting door or other form of access may also be locked and access only provided in response to a user interacting with the user interface 211, such as selecting to return or ship an item. In various implementations, such a drop-box or other area of the mobile pickup unit 200 may also be utilized for receiving packaging materials or other items from users. For example, a user who wishes to open a package containing an item at the mobile pickup unit may instructed to place the packaging materials (e.g., cardboard box, wrapping, filler, etc.) in the drop-box or other storage area of the mobile pickup unit.

The storage compartment modules 203, 205, 207, 209 as well as the control station 201 and/or the mobile machine 290 or other transport mechanism may also include self-leveling feet 279 that may be used to level the storage compartment modules 203, 205, 207, 209 and/or control station 201 when located on un-level surfaces. In configurations where the self-leveling feet 279 are utilized, they may be adjusted so that a storage compartment module, such as storage compartment module 205, 207, can be positioned so it is flush and aligned with a control station 201 or another storage compartment module. As an alternative to self-leveling feet 279, any other type of support mechanism may be utilized with various implementations described herein for supporting the control station 201 or any storage compartment module 203, 205, 207, 209. For example, the control station 201 may utilize self-leveling feet while the storage compartment modules 203, 205, 207, 209 may utilize rolling casters or wheels. The casters/wheels may further enable the ease with which storage compartment modules may be added or removed from a control station 201, thereby allowing the easy addition/removal of capacity for the mobile pickup unit 200. Depending on the type of mobile machine 290 or other transport mechanism that is utilized for the transport of the mobile pickup unit 200, the rolling casters or wheels may be removed or disabled so as to prevent unwanted motion of the control station 201 and/or any of the storage compartment modules 203, 205, 207, 209 when the mobile machine 290 or other transport mechanism moves.

In various implementations, the mobile pickup unit 200 may be attachable and detachable to and from a mobile machine 290. Once detached from the mobile machine 290, special locking mechanisms may be utilized which prevent movement of the mobile pickup unit 200 or other transport mechanism by anyone other than an authorized agent. Power connections may also be provided for allowing the mobile pickup unit 200 to draw power from the mobile machine 290 or from a power source at a designated user pickup area. In one implementation, power may be provided from solar panels that are attached to the mobile pickup unit or are otherwise located at the user pickup area. The mobile pickup unit may also or alternatively have a rechargeable battery source. In one implementation, the mobile pickup unit may be charged and stocked with items at a materials handling facility, and then may travel to a designated user pickup area where the items are retrieved by users, after which the mobile pickup unit may travel back to the materials handling facility for restocking and recharging.

In various implementations, the mobile pickup unit 200 may also include a locator device (not shown) that is configured to assist a user with finding the mobile pickup unit (e.g., while the mobile pickup unit is parked, etc.). For example, the locator device may wirelessly transmit an electronic signal that enables the position of the mobile pickup unit to be tracked and/or otherwise determined (e.g., as indicated on a screen of a mobile electronic device carried by a user, etc.). As another example, the locator device may emit various sounds, activate lights, etc. (e.g., when a user is determined to be nearby) to assist the user with finding the mobile pickup unit. In various implementations, the locator device may be controlled by the control station 201 and/or a central management system (FIG. 4), etc.

Figure 3:
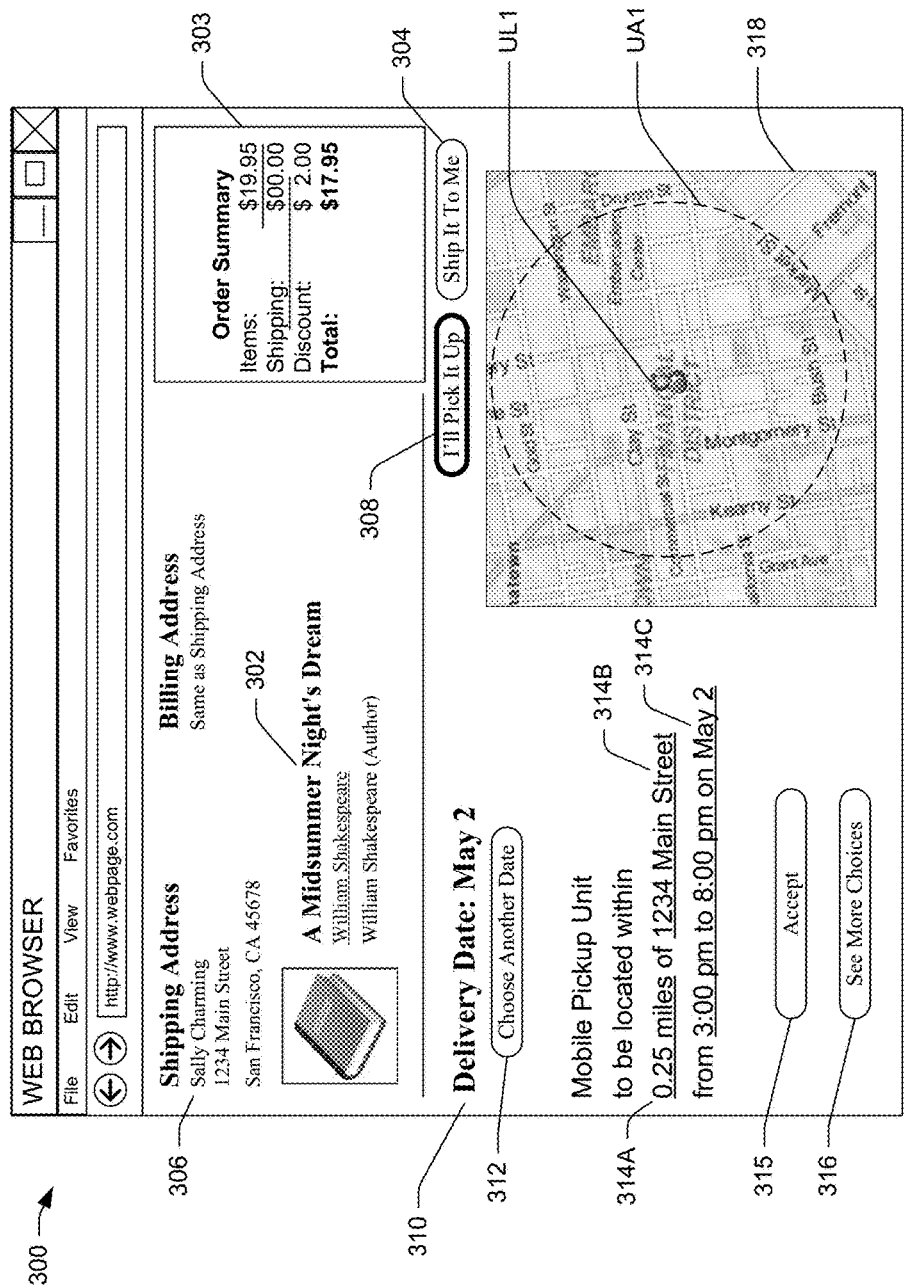
FIG. 3 depicts an example graphical user interface for an order in which a user selects to retrieve an item from a mobile pickup unit, according to some implementations.

FIG. 3 depicts a graphical user interface 300 in which a user selects to retrieve an ordered item from a mobile pickup unit, in one implementation. As shown in FIG. 3, in this example the user has requested to purchase a book entitled "A Midsummer Night's Dream" 302. The cost of the order may be displayed in an order summary window 303. As part of the purchase process, the user may select to have the item delivered to the user (e.g., attended or unattended delivery) or select a mobile pickup unit from which the user can retrieve the item. For example, the user may select the "Ship it to me" button 304 and provide a shipping address 306 to which the item is to be delivered. Attended delivery, as used herein, is delivery to a user specified location (e.g., residence or business address) at a prearranged time when the user or other individual will meet the delivery person to receive delivery of the item. Attended delivery includes, but is not limited to a scheduled delivery, COD, items that require signature for delivery (e.g., alcohol), or if there is no secure location at which to leave the item. Unattended delivery, as used herein, is delivery of an item to a user specified location (e.g., residence or business address) where the item may be left unattended, such as on the user's front porch or in an apartment mailroom.

Alternatively, the user may select the "I'll pick it up" button 308 and select a mobile pickup unit for delivering the item to a user pickup area where the user may retrieve the item. In some implementations, the user may receive a discount or other incentive to utilize the option of retrieving the item from a mobile pickup unit. In various implementations, a mobile pickup unit may also be utilized as a backup or other alternative for an attended or unattended delivery. For example, if a user is not home at a time when an attended delivery of an item is attempted, the item may instead be delivered (e.g., by a carrier) to a mobile pickup unit, wherein the user may retrieve the item at a later time from the mobile pickup unit.

As part of the purchase process, a central management system 426 (FIG. 4) may identify a delivery date 310 indicating the day or days during which the purchased item 302 will be available for retrieval by the user. To choose another delivery date, a user may select the "choose another date" button 312. In various implementations, information related to the selection of a mobile pickup unit may be provided through utilization of a travel limit indicator 314A, a user location indicator 314B and a time period indicator 314C. In the example of FIG. 3, the travel limit indicator 314A indicates a travel limit of 0.25 miles. In various implementations, a central management system may determine one or more travel limit options and/or a user may be able to provide or select a travel limit. In the example of FIG. 3, the travel limit is indicated in terms of distance, although it will be appreciated that in alternative implementations, the travel limit may be indicated in terms of time (e.g., five minutes walking), or in terms of other parameters. In various implementations, the travel limit and other factors may be related to the mode of transportation of a user. For example, a user may provide an indication that the user will be walking, driving, taking a bus, etc., which may affect the expected travel times, etc.

In the example of FIG. 3, the user location indicator 314B indicates a location of "1234 Main Street". In various implementations, the user location may correspond to a shipping address or other location that is stored in a user account or otherwise indicated or provided by a user. The time period indicator 314C indicates a time window corresponding to "3:00 p.m. to 8:00 p.m. on May 2". In various implementations, a time window may be determined by a central management system and/or may be selectable or modifiable by a user. If a user is satisfied with the current parameters for a mobile pickup unit, the user may select a "accept" button 315. Alternatively, a user may select a "see more choices" button 316 to see additional choices. For example, a central management system may provide additional options and/or a user may be enabled to select or modify the parameters specified by each of the travel limit indicator 314A, user location 314B and/or time period indicator 314C.

In various implementations, a map 318 may also be provided which indicates a user location UL1 (e.g., as corresponding to the information indicated by the user location indicator 314B), and a user travel area UA1 (e.g., as corresponding to the information indicated by the travel limit indicator 314A). It will be appreciated that, while the user travel area UA1 is generally circular in the example of FIG. 3, other shapes of user travel areas may also occur. For example, in an instance where a user travel area is inhibited by various obstacles (e.g., a barrier, a body of water, etc.), the shape of the resulting user travel area may be affected. As another example, if the travel limit is defined in terms of travel time, various factors (e.g., weather, traffic conditions, available pathways, etc.), may affect a user's speed and/or ability to travel, and may correspondingly affect the size and/or shape of the user travel area.

In various implementations, a shape or number of user travel areas may also be affected if a user location that is used to determine the user travel area (or areas) corresponds to more than a single point. For example, if a user is expected to be at work until 5:00 p.m., but then will travel so as to be home at 5:30 p.m., both the user's work and home addresses may be utilized as options for determining corresponding user travel areas for the user. In such an instance, the user may be provided with options for selecting mobile pickup units that may be available relative to the user's work and/or home addresses, etc. As another example, if a user walks or otherwise commutes between home and work each day, a user may be willing to deviate from the usual travel path (e.g., by up to 0.25 miles in either direction, etc.). In such an instance, the user travel area representing the travel limit may correspond to a 0.25 mile wide range on either side of the user's usual travel path for the commute. It will be appreciated that the user locations in such a scenario are based on both geographical locations and times of day depending on where the user is expected to be at a given time. Similar to the other processes described above, a determination may be made if the user travel area corresponding to the commute path for the user (e.g., during which the user travels along the commute path beginning with leaving work at 5:00 p.m. and arriving at home at 5:30 p.m.) overlaps with other user travel areas (e.g., wherein the overlapping area may be designated as a user pickup area that a mobile pickup unit may travel to).

In various implementations, a user may be enabled to interact with various elements of the map 318 in order to modify a parameter. For example, a user may be enabled to modify a specified user location UL1 by dragging or otherwise repositioning an icon for the user location UL1 to a new location on the map 318. As another example, a user may be enabled to modify the user travel area UA1 by clicking and dragging a border of the user travel area to be at a new location and/or to be in a new shape (e.g., so as to reshape, move, and/or increase or decrease the overall size of the user travel area, etc.).

In various implementations, sometime after the user makes the selection to retrieve the ordered item from a mobile pickup unit, the user's item may be picked and placed in a mobile pickup unit at a materials handling facility (e.g., as described above with respect to FIG. 1). The mobile pickup unit containing the item may then travel to the user pickup area so that the item can be retrieved by the user from the mobile pickup unit during the specified time window on the specified day. As indicated in the user interface 300, the mobile pickup unit is scheduled to be parked within the user travel area UA1, on the delivery date of May 2, from 3:00 p.m. to 8:00 p.m. In one implementation, once the user completes the order for the item, the user may be provided with instructions (e.g., by email or other electronic messaging) indicating when the mobile pickup unit is expected to arrive in the user pickup area and that a further notification will be provided once the mobile pickup unit has parked. For example, after the mobile pickup unit has parked, a notification may be sent to the user which indicates the parking location coordinates (e.g., GPS coordinates), turn-by-turn directions, and/or a description of the parking location, etc. The user may also be provided with an access code for retrieving the ordered item from a storage compartment in the mobile pickup unit. Alternatively, the user may be provided with other instructions for gaining access to the storage compartment. For example, the user may be provided with instructions to respond to a text message from the system when the user is at the mobile pickup unit and ready to retrieve the item, which may prompt the system to open a storage compartment or otherwise enable the user to retrieve the item.

While a specific example process has been described above with respect to FIG. 3, it will be appreciated that options related to mobile pickup units may be determined and displayed in a variety of manners and through a variety of processes. For example, a user may specify a preference for utilizing mobile pickup units and/or the central management system 426 may suggest the use of a mobile pickup unit based on prior user orders, the user's location, distribution locations, etc. The central management system 426 may also identify a user location UL1 using a variety of techniques. For example, a user's shipping address may be designated as the user's location. As another example, if the user is purchasing an item using a mobile device, global positioning satellite (GPS) information may be provided to the central management system 426 by the mobile device and used to determine the user's location. Alternatively, an IP address of the user's device may be used to determine a user location.

FIG. 4 is a block diagram of an illustrative mobile pickup unit environment 400 that enables a user 402 to select to retrieve an ordered item from a mobile pickup unit 200. The mobile pickup unit environment 400 includes a user interface, such as a graphical user interface 300 (FIG. 3), that allows a user 402 to place an order for purchase of an item that will be retrieved by the user from a mobile pickup unit 200. As will be described in more detail below with respect to FIG. 5, as part of the ordering process, travel-related data may be received that indicates a travel limit for the user 402 for travelling to the mobile pickup unit 200 for performing a pickup unit activity (e.g., retrieving an ordered item, returning an item, etc.). In various implementations, the user interface that enables the user to place the order for the item may be a graphical user interface, such as graphical user interface 300, an audio only interface, a multi-mode interface, or any other interface for interacting with the user 402. The user interface may be provided to the user 402 through any type of electronic device 406, such as a tablet, desktop, laptop, smart phone, personal digital assistant, netbook, etc. The user interface may be delivered to the electronic device 406 by one or more remote computing resources 410 that make up part or all of an electronic commerce shopping environment. In other embodiments, the user interface may be in direct communication between a user and an agent.

The remote computing resources 410 may form a portion of a network-accessible computing platform implemented as a computing infrastructure of processors, storage, software, data access, and other components that is maintained and accessible via a network 408. Services, such as e-commerce shopping services, offered by the remote computing resources 410 do not require that the user have knowledge of the physical location and configuration of the system that delivers the services. The electronic device 406 may communicatively couple to the remote computing resources 410 via the network 408 which may represent wired technologies (e.g., wires, USB, fiber optic cable, etc.), wireless technologies (e.g., RF, cellular, satellite, Bluetooth, etc.), and/or other connection technologies. The network 408 carries data between the electronic device 406 and the remote computing resources 410.

After receiving from a user 402 a request to purchase an item and a selection of a mobile pickup unit 200 for delivering the item to a user pickup area, the electronic device 406 may send this information to the remote computing resources 410 over the network 408. As illustrated, the remote computing resources 410 may include one or more servers, such as servers 420(1), 420(2), . . . , 420(N). These servers 420(1)-(N) may be arranged in any number of ways, such as server farms, stacks, and the like that are commonly used in data centers. Furthermore, the servers 420(1)-(N) may include one or more processors 422 and memory 423 which may store a central management system 426.

The central management system 426 may be configured, for example, to receive orders for items from users and to perform order planning and filling of mobile pickup units 200 with items (e.g., at a materials handling facility 430) and/or scheduling of deliveries of items to other user specified delivery locations. In some instances, the central management system 426 may separate an order into shipment sets and instruct one or more materials handling facilities 430 to fulfill the shipment sets to the user specified delivery location or to a mobile pickup unit 200 for delivery to a user pickup area. In fulfilling orders to a mobile pickup unit 200, the materials handling facility 430 may utilize any of the processes described above with respect to FIG. 1.

The mobile pickup unit 200 may also communicatively couple to the remote computing resources 410 via the network 408. For example, the communications to and from the mobile pickup units 200 may utilize the main access point 232 and/or the wireless antennas of the mobile pickup units, such as the wireless antennas 241, 243, 231, 245, 247 described above with respect to FIG. 2. Communications may be to and from the command component of the control station for each of the mobile pickup units, such as the control station 201, and may also be to and from the storage compartment management components of each connected storage compartment module, such as the storage compartment modules 203, 205, 207, 209.

The central management system 426 may also be configured, for example, to communicate with the mobile pickup unit 200. In various implementations, the general activities of mobile pickup units, including those related to the planning and implementation of the mobile pickup units receiving items, and the travelling of the mobile pickup units to and from the designated user pickup areas and the retrieval of the items by users, may be coordinated by the central management system 426. For example, the central management system 426 may receive or determine schedule data for the travelling of the mobile pickup units 200 to the designated user pickup areas and for the return of the mobile pickup units back to the materials handling facilities. In various implementations, the central management system 426 may also receive tracking data (e.g., GPS) regarding the coordinates of the mobile pickup units. The GPS data may be utilized for various purposes, such as answering location status requests or for sending notifications regarding the current positions (e.g., during travel and/or at parking locations) of the mobile pickup units. For example, a user may request that a notification be sent when a mobile pickup unit 200 with an ordered item is approaching a designated user pickup area and/or has parked in the user pickup area.

Figure 5:
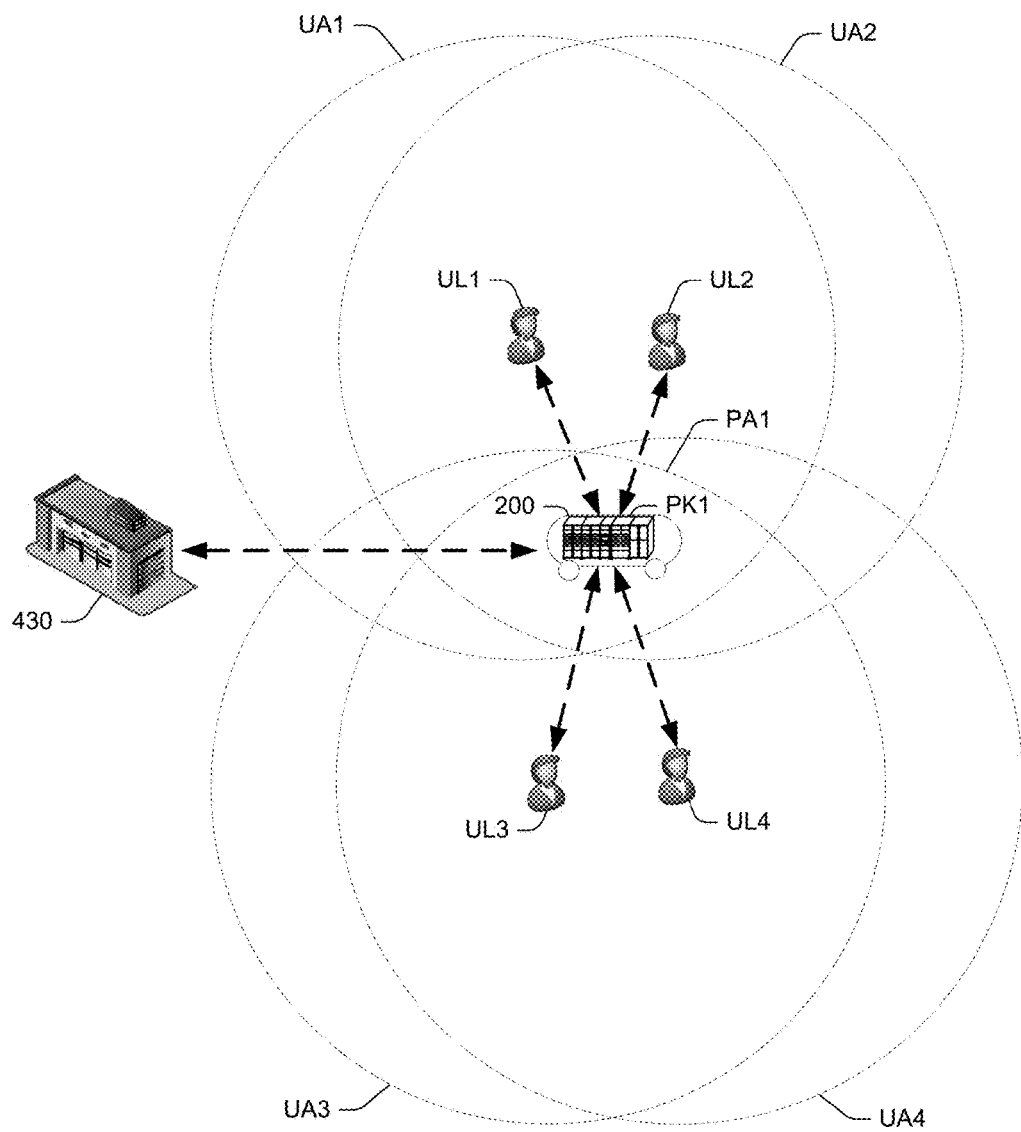
FIG. 5 depicts a block diagram illustrating travel of a mobile pickup unit to a user pickup area, according to some implementations.

FIG. 5 depicts a block diagram illustrating a mobile pickup unit 200 travelling from a materials handling facility 430 to a user pickup area PA1. As described above with respect to FIG. 4, when an order for one or more items is placed by a user, a shipment set may be assigned to a materials handling facility 430 for fulfillment. In various implementations, a user may select a mobile pickup unit 200 for delivering an ordered item to a user pickup area, rather than having the ordered item delivered to the user's house, apartment, office or other location. This may be convenient to the user if they may not be available when the item would otherwise be delivered to the location, may not want others located at alternative delivery locations to know that they have ordered an item (e.g., a mother may not want a gift for their child delivered to the house) or may not want the item left at an unsecure location (e.g., front porch, mailroom) if they are not present when the item is delivered.

For items that have been ordered with a mobile pickup unit 200 designated for the delivery, the ordered items may be picked and placed into one or more storage compartments of the mobile pickup unit 200 while the mobile pickup unit 200 is at the materials handling facility 430. Other items associated with other orders may also be picked and placed in the mobile pickup unit 200 while the mobile pickup unit 200 is located at the materials handling facility 430, and then the mobile pickup unit 200 may travel to a determined user pickup area PA1. In an instance where an item is to be delivered to the mobile pickup unit 200 after the mobile pickup unit 200 has already reached the user pickup area PA1, the item may be picked into one or more delivery containers, transported to the mobile pickup unit 200, placed in one or more storage compartments of the mobile pickup unit 200 and made available for retrieval by a user.

In the example of FIG. 5, users who have ordered items are designated as being at user locations UL1, UL2, UL3 and UL4, respectively. The first user location UL1 is shown to be surrounded by a first user travel area UA1, the second user location UL2 is shown to be surrounded by a second user travel area UA2, the third user location UL3 is shown to be surrounded by a third user travel area UA3, and the fourth user location UL4 is shown to be surrounded by a fourth user travel area UA4. In various implementations, each of the user travel areas UA1-UA4 may represent travel limits for the users from the respective user locations UL1-UL4. For example, as part of an ordering process, travel-related data may be received which indicates at least one of a maximum travel distance, time, etc. Such travel-related data may thus indicate a travel limit for a user for travelling from a user location to a mobile pickup unit for performing a pickup unit activity (e.g., retrieving an ordered item that is stored in a storage compartment of the mobile pickup unit, returning an item, etc.). In various implementations, such maximum travel distances, times, etc. may be designated by a central management system and/or selected by the individual users, etc. In various implementations, the travel limits and other factors may be related to the mode of transportation of a user. For example, a user may provide an indication that the user will be walking, driving, taking a bus, etc., which may affect expected travel times, etc.

In various implementations, once the user travel areas UA1-UA4 have been determined, a user pickup area PA1 may be determined in accordance with an area where the user travel areas UA1-UA4 overlap. The user pickup area PA1 may thus be within the travel limits relative to each of the user locations UL1-UL4. In an alternative implementation, the user pickup area PA1 may generally be predetermined, rather than being determined in accordance with where the user travel areas UA1-UA4 overlap. For example, a user pickup area PA1 may be based on an area that is expected (e.g., based on statistics regarding user orders in a given region, etc.) to be within the travel limits of various users who may place orders. In such a scenario, each of the users corresponding to the user locations UL1-UL4 may be provided with an option for selecting a mobile pickup unit that is already planned to be parked somewhere within the user pickup area PA1, and which falls within the respective user travel areas UA1-UA4. In either case, once the user pickup area PA1 is determined, a mobile pickup unit 200 may be designated to be parked at a parking location within the user pickup area PA1 to enable the users from the user locations UL1-UL4 to travel to the mobile pickup unit 200 without exceeding the travel limits indicated by the travel-related data (e.g., for which the user travel areas UA1-UA4 may represent the respective travel limits).

In some instances, a group of user travel areas may not all overlap. For example, in an instance where a first three out of four user travel areas overlap, the overlapping area may still be determined as a user pickup area for the first three users. In such an instance, a notification may be provided to the fourth user indicating that if the user is willing/able to increase the user travel area (e.g., willing to travel a little further to the mobile pickup unit), the mobile pickup unit can still be utilized by the fourth user. Alternatively, if the fourth user is not able/willing to travel the additional distance to the mobile pickup unit, other delivery options may be provided for the fourth user (e.g., utilizing the same or a different mobile pickup unit at a later time, delivery by a traditional carrier, etc.).

In various implementations, instructions may be received (e.g., from a central management system 426) to place ordered items in storage compartments of the mobile pickup unit 200 while the mobile pickup unit is at the materials handling facility 430 before the mobile pickup unit travels to the user pickup area PA1. After the mobile pickup unit 200 is filled with ordered items at the materials handling facility 430 (e.g., utilizing any of the techniques described above with respect to FIG. 1), the mobile pickup unit 200 may receive travel instructions (e.g., from the central management system 426) for travelling along a travel path from the materials handling facility 430 to the user pickup area PA1. Once the mobile pickup unit has arrived at the user pickup area PA1, a search may begin for a parking location within the user pickup area PA1, as will be described in more detail below with respect to FIG. 10.

In various implementations, a parking location PK1 where the mobile pickup unit 200 parks may correspond to a parking space (e.g., along a side of a public street, in a public parking lot, etc.) or any other type of location where a mobile pickup unit may be parked. Once the mobile pickup unit 200 has parked in the parking location PK1, notifications may be sent regarding the parking location PK1. For example, the mobile pickup unit 200 may send a notification to a central management system 426 and/or directly to users regarding the parking location PK1. A notification that is sent to a user (e.g., from the central management system 426 or directly from the mobile pickup unit 200) may include information regarding the parking location PK1 to assist the user with finding the parking location. For example, the coordinates (e.g., GPS coordinates, etc.) of the parking location PK1 may be provided, and/or other types of relevant data or directions may be provided, etc. In one implementation, turn-by-turn directions may be provided for reaching the parking location PK1 which may include cross streets and/or one or more addresses that are close to the parking location PK1, etc.

In various implementations, the mobile pickup unit 200 may include visual indicators or other elements for assisting a user with finding the mobile pickup unit 200. For example, the mobile pickup unit 200 may have particular symbols, colors, lights, etc. for enabling identification of the mobile pickup unit 200. As another example, GPS or other coordinates may be provided that enable a user device or application to view and/or track the current location of the mobile pickup unit 200 on a screen of a user device and may provide turn-by-turn or other directions for assisting a user in travelling to and identifying the mobile pickup unit 200. In various implementations, the mobile pickup unit 200 may include a locator device that is configured to assist a user with locating the mobile pickup unit. For example, the locator device may transmit a signal that enables the location of the mobile pickup unit to be tracked and/or otherwise determined. As another example, a locator device may be configured to emit various sounds, activate lights, etc. (e.g., when a user is determined to be nearby).

In various implementations, the mobile pickup unit 200 may be designated (e.g., by the central management system 426, etc.) to remain at the parking location PK1 for a specified time period. For example, a time window (e.g., 3:00 p.m. to 8:00 p.m.) may be determined for the mobile pickup unit 200 to remain at the parking location PK1. While the mobile pickup unit 200 is at the parking location PK1, various users may travel from corresponding user locations to the mobile pickup unit 200 for retrieving ordered items. As will be described in more detail below with respect to FIG. 6, after some users have retrieved items, the mobile pickup unit 200 may be relocated to be closer to any remaining users who have not yet retrieved ordered items.

Figure 6:
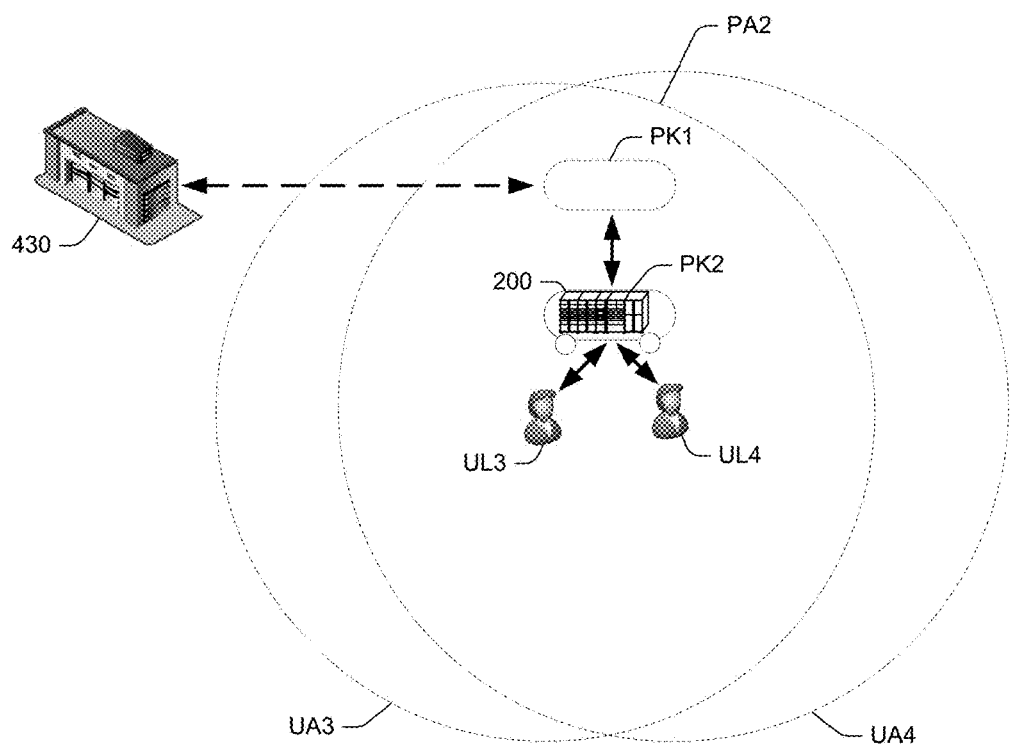
FIG. 6 depicts a block diagram illustrating repositioning of a mobile pickup unit after some items have been retrieved by users, according to some implementations.

FIG. 6 depicts a block diagram illustrating a relocating of a mobile pickup unit 200, according to some implementations. In one scenario, the users from the user locations UL1 and UL2 (e.g., as shown in FIG. 5) may have retrieved their ordered items, such that the ordered items remaining in the mobile pickup unit 200 correspond to the users at the user locations UL3 and UL4. In accordance with this scenario, a determination may be made that the mobile pickup unit 200 will be relocated from the parking location PK1 to a parking location PK2 that is closer to the user locations UL3 and UL4.

In various implementations, a determination of when a mobile pickup unit 200 is to be relocated may be performed at specified times. For example, as described above with respect to FIG. 5, the mobile pickup unit 200 may be designated to remain at the parking location PK1 for a specified time window (e.g., from 3:00 p.m. to 8:00 p.m.). At the end of the specified time window, or otherwise after the users from the user locations UL1 and UL2 have retrieved their ordered items, a determination may be made that the mobile pickup unit 200 is to be moved to a parking location that is closer to the remaining user locations UL3 and UL4. As part of the relocation process, a new user pickup area PA2 may be determined (e.g., as representing an overlap of the user travel areas UA3 and UA4). Within the user pickup area PA2, a parking location PK2 may be found that is closer to the user locations UL3 and UL4 than the original parking location PK1.

As part of the relocation process, notifications may be sent (e.g., from the mobile pickup unit 200 to a central management system and/or directly to users, etc.). In various implementations, notifications that are sent to the users (e.g., from the central management system and/or directly from the mobile pickup unit 200, etc.) may include information regarding the relocation and/or the new parking location PK2. For example, the users at the user locations UL3 and UL4 may be sent notifications that indicate that the mobile pickup unit 200 is being relocated. In addition, once the mobile pickup unit 200 has parked in the parking location PK2, notifications may be sent regarding the parking location PK2. For example, as described above with respect to the parking location PK1, various coordinates, travel instructions, identifiers, etc. may be provided for helping the users from the user locations UL3 and UL4 travel to and locate the mobile pickup unit 200 at the parking location PK2.

In various implementations, in addition to previously ordered items, mobile pickup units 200 may also be used to transport high-volume and/or release day items. A high-volume item may be, for example, an item that is frequently ordered, such as a popular book, shoe, video game, tablet, etc. A release day item may be an item that will become available on the day it is released to the general public (e.g., book, movie, game, toy, etc.). For high-volume and/or release day items, they may be picked and placed in storage compartments of various mobile pickup units before the mobile pickup units travel to user pickup areas so that the items will be immediately available to users and/or available for pickup on the release day.

In various implementations, certain storage compartments of a mobile pickup unit may be reserved for high-volume and/or release day items and/or any available storage compartments that have not been filled with user orders may be utilized for the high-volume and/or release day items. For example, when a mobile pickup unit is ready to travel to a user pickup area, any of the empty storage compartments may be filled with high-volume and/or release day items in case those items are ordered by users. When a user orders one of the high-volume and/or release day items, a storage compartment containing one of those items may be associated with the user's order and the item made immediately available for retrieval by the user. In various implementations, a mobile pickup unit may also include a storage area (e.g., a general storage compartment), that may include extra high-volume and/or release day and/or other items that users may order. As storage compartments are emptied by users retrieving items, the storage compartments may be refilled from within the mobile pickup unit (e.g., by an agent, automated mechanism, etc.) with items from the storage area. In this manner, the stock of high-volume and/or release day and/or other items that are available in the storage compartments of the mobile pickup unit may continue to be refilled (e.g., while the mobile pickup unit is at a parking location, travelling, etc.).

In various implementations, a mobile pickup unit 200 may also stop at a stopping point on the way to a user pickup area (e.g., on the way to user pickup area PA1). For example, produce or refrigerated items may be able to be delivered in a fresher state and/or require less time and/or energy for refrigeration during transport if the items are picked up from one or more vendors on the way to the user pickup area. Other types of items may also be received from vendors. As another example, the mobile pickup unit may also stop to receive some items from additional materials handling facilities 430 on the way to a user pickup area. In various implementations, the mobile pickup unit may also stop and/or otherwise receive items from a delivery associate or other carrier of items. For example, the mobile pickup unit may travel to meet a carrier with an item at a designated location and/or a carrier may travel to meet the mobile pickup unit (e.g., while the mobile pickup unit is on its way to a location and/or after the mobile pickup unit has arrived at a location and parked, etc.).

In various implementations, the mobile pickup unit may also have capabilities for on-demand production of items. For example, books may be produced through an on-demand printing process within the mobile pickup unit. As another example, a three-dimensional printer may be utilized within the mobile pickup unit for producing items. Such items may be produced on-demand to fulfill user orders that may be placed at various times (e.g., after the mobile pickup unit has left a materials handling facility, while the mobile pickup unit is parked, etc.).

In various implementations, mobile pickup units may also be utilized for returns of items by users. For example, as part of a pickup unit activity that is related to a return of an item, a user may place the item that is to be returned into one of the storage compartments, or into a storage compartment module configured as a drop-box for returns. A user may also indicate that they will not be retrieving an ordered item from a storage compartment of the mobile pickup unit 200, and that they wish to instead have the item returned. In some instances, a refund or replacement process may be initiated when an item is received or left at the mobile pickup unit 200 for a return. When the mobile pickup unit is transported back to the materials handling facility 430, the returned item may be removed from the storage compartment and further processed for the return. In one scenario, at least some of the user locations UL1-UL4 and corresponding user travel areas UA1-UA4 may correspond to users who wish to make returns, rather than users who have ordered items, and/or may include a mix of users who have ordered items and/or wish to make returns. In such scenarios, the user pickup area PA1 may correspond to an area where a mobile pickup unit 200 is parked to pick up items from users as part of return processes for the items.

Figure 7:
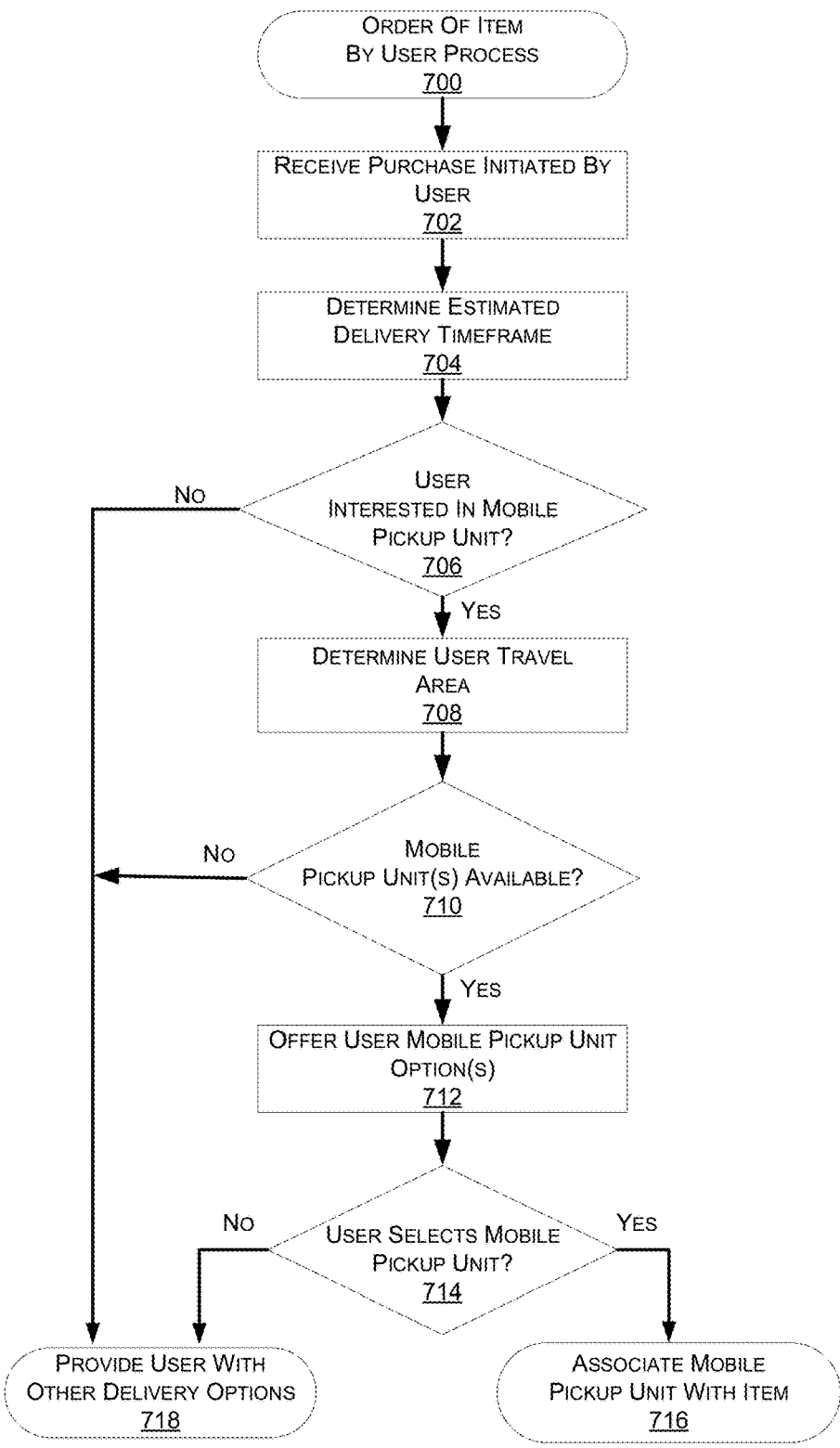
FIG. 7 is a flow diagram illustrating an example process for processing a user order for an item, according to some implementations.

FIG. 7 is a flow diagram illustrating an example process 700 for processing a user order for an item. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 700 begins with the receipt of a purchase request initiated by a user, as in 702. Upon receiving a purchase request for an item from a user, a determination is made as to the estimated delivery timeframe for that item, as in 704. In some examples, this may include identifying a materials handling facility with the requested item in stock and estimating the time required to fulfill the item to the user. In other implementations, the estimated delivery timeframe may be a set day from the date of the purchase request or a series of days. For example, a user may specify that the delivery timeframe is to be one day from the date of purchase request or between three and five days from the date of the purchase request. In still other implementations, the estimated delivery timeframe may be a set day of the week upon which the user has requested to have items delivered. For example, a user may preselect to have items ordered during the week delivered on Thursday of every week.

In addition to determining an estimated delivery timeframe, a determination is made as to whether the user is interested in retrieving the item from a mobile pickup unit, as in 706. Determining whether a user is interested in retrieving the item from a mobile pickup unit may be done, for example, by receiving an interaction from the user through a user interface 300 selecting to retrieve the item from a mobile pickup unit. Alternatively, a user may preselect or provide a preference that they prefer to retrieve their items from mobile pickup units.

If it is determined that the user is interested in retrieving the item from a mobile pickup unit, a user travel area is determined, as in 708. In various implementations, a user travel area may be determined that is defined at least in part by travel-related data that has been provided by the user and/or is otherwise available from a central management system 426. For example, as described above with respect to FIG. 3, a user travel area may correspond to a travel limit from a user location, wherein the user location and/or travel limit (e.g., as corresponding to a maximum travel distance, maximum travel time, etc.) may be included as part of travel-related data that is received from the user. In various implementations, a graphical display of a user travel area may be presented to a user (e.g., on a map 318), which the user may be able to approve, modify, etc.

Upon determining a user travel area, a determination is made as to whether one or more mobile pickup units may be available for travelling to the user travel area, as in 710. In various implementations, a determination as to whether one or more mobile pickup units may be available may be based at least in part on a determination of a user pickup area, as will be described in more detail below with respect to FIG. 8. For example, if a user pickup area that a mobile pickup unit will travel to has already been determined (e.g., as based on existing and/or expected user orders and corresponding user travel areas), and if a portion of the existing user pickup area falls within the current user travel area, a mobile pickup unit may be indicated as available for transporting the item. In various implementations, if a user travel area is not expected to overlap with other user travel areas or otherwise have a section that is within a user pickup area (e.g., due to being too small, too far away from other user travel areas, etc.), a user may be notified that they may increase the likelihood of being able to utilize a mobile pickup unit by modifying (e.g., increasing, moving, etc.) the user travel area. In some instances, the central management system may suggest parameter values (e.g., in terms of size, location, etc.) of a user travel area for which a mobile pickup unit may be available.

Once it is determined that there may be one or more mobile pickup units available, the user may be provided with options (e.g., as described above with respect to FIG. 3) for selecting a mobile pickup unit for delivering the item to the user pickup area, as in 712. After the mobile pickup unit options are offered to the user, a determination is made as to whether the user has selected a mobile pickup unit for delivery of the item, as in 714. If the user has selected a mobile pickup unit for delivery of the item, a mobile pickup unit is associated with the item and is designated for the delivery, as in 716.

If it is determined that the user is not interested in using a mobile pickup unit, as in 706, that no mobile pickup unit is expected to be available, as in 710, or if the user does not select a mobile pickup unit for the delivery of the item, as in 714, the example process provides the user with other delivery options, as in 718. Other delivery options may include allowing the user to select an alternative user travel area, schedule an unattended delivery (e.g., utilizing a traditional carrier, etc.), and the like. If the user selects an alternative user travel area, the example process may return to decision block 710 and continue, otherwise the example process completes.

Figure 8:
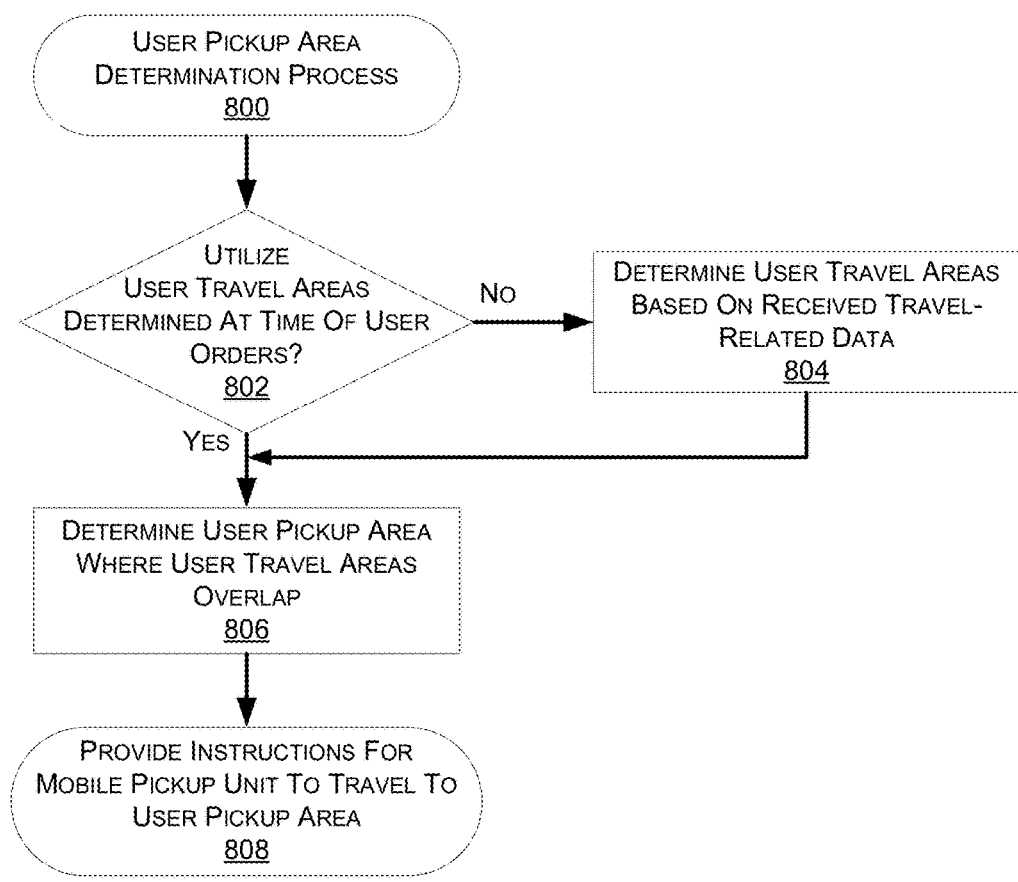
FIG. 8 is a flow diagram illustrating an example process for evaluating multiple user orders to determine a user pickup area, according to some implementations.

FIG. 8 is a flow diagram illustrating an example process 800 for determining a user pickup area. The example process begins with a determination as to whether user travel areas that were determined at the time of user orders will be utilized for the user pickup area determination process. In various implementations, user travel areas may not have been determined at the time of user orders and/or the user travel areas may depend on current and/or expected conditions, etc. For example, if the user travel areas depend on travel times which may be affected by various conditions (e.g., traffic conditions, weather conditions, etc.), the user travel areas may be redetermined (e.g., based on current weather forecasts, etc.) when the user pickup area is to be determined.

If user travel areas are to be determined, the user travel areas are determined based on received travel-related data, as in 804. For example, as described above, travel-related data may be received as part of user orders, or may otherwise be received (e.g., as part of a user's account settings, preferences, etc.), that indicates a maximum travel time, a maximum travel distance, etc. for a user to travel to a mobile pickup unit. The travel-related data may also indicate a user location (e.g., corresponding to a user's home, work, other location from which a user will travel to a mobile pickup unit, etc.).

Once the user travel areas have been determined, as in 804, or if the user travel areas were previously determined, as in 802, a user pickup area is determined where the user travel areas overlap, as in 806. For example, as illustrated in FIG. 5, in an instance where user travel areas are generally circular, the user pickup area may be determined according to an area where the circular travel areas overlap. At some time after the user pickup area has been determined, instructions are provided for a mobile pickup unit to travel to the user pickup area, as in 808. For example, if a mobile machine (e.g., a car, truck, etc.) that is part of or otherwise utilized for transporting the mobile pickup unit is driven by an agent, instructions may be provided to the agent and/or to an electronic device (e.g., a GPS device) that is utilized by the agent for navigating to the user pickup area. Alternatively, if the navigation of the mobile pickup unit is autonomously controlled, the instructions may include information regarding the user pickup area (e.g., coordinates for the user pickup area and/or other waypoints or data) to enable the mobile pickup unit to autonomously navigate to the user pickup area. As will be described in more detail below with respect to FIG. 10, in various implementations, after the mobile pickup unit arrives at the user pickup area, the mobile pickup unit may be parked at a parking location within the user pickup area to enable users to travel to the mobile pickup unit without exceeding the travel limits for each user as indicated by the received travel-related data.

Figure 9:
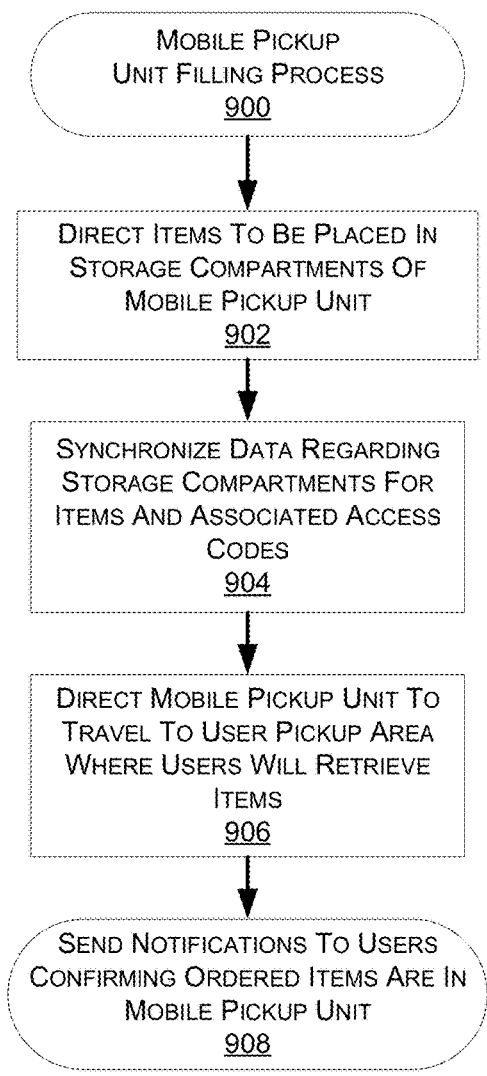
FIG. 9 is a flow diagram illustrating an example process for filling a mobile pickup unit with ordered items before the mobile pickup unit travels to a user pickup area, according to some implementations.

FIG. 9 is a flow diagram illustrating an example process 900 for filling a mobile pickup unit with items. The example process begins with directing that items be placed into storage compartments of the mobile pickup unit, as in 902. For example, as described above with respect to FIGS. 1 and 3, for items that have been ordered with a mobile pickup unit designated for the delivery of the items, the ordered items may be picked and placed at a materials handling facility into one or more storage compartments of the mobile pickup unit. In some instances, a storage compartment may contain only a single item, or may contain multiple items (e.g., as part of a user order, etc.). As further described above, mobile pickup units may also be used to transport non-ordered items, such as high-volume and/or release day items. As another example, in addition to receiving items at a materials handling facility, the mobile pickup unit may also travel to a location (e.g., to a vendor) for receiving items.

After the items have been placed into the storage compartments of the mobile pickup unit, data may be synchronized regarding the storage compartments for the items and associated access codes, as in 904. In various implementations, at least some of the data that is synchronized may be generated as the items are placed into the storage compartments of the mobile pickup unit. For example, as described above with respect to FIG. 2, the mobile pickup unit and/or individual storage compartments may include unique identifiers, such as a bar code, QR code, unique number, etc., to enable tracking, identification and association of items placed into the storage compartments of the mobile pickup unit. Scanning of the storage compartments and the picked items may result in the items becoming associated with the storage compartments and tracked with the mobile pickup unit. Access codes for the storage compartments may also be generated and associated with the ordered items. In various implementations, the associated data may be synchronized between the control station of the mobile pickup unit and the central management system. This allows the central management system to provide information to users (e.g., access codes, storage compartment numbers, etc.) as well as enabling the control station of the mobile pickup unit to allow users to retrieve their orders, even if communication with the central management system becomes unavailable.

After the data has been synchronized, the mobile pickup unit is directed to travel to a user pickup area where users will retrieve the items, as in 906. Once the mobile pickup unit has been directed to travel, notifications may be sent to users confirming that ordered items are in the mobile pickup unit, as in 908. For example, a user may wish to receive a confirmation that an ordered item is in a mobile pickup unit that is on the way to a user pickup area. Such notifications may indicate an estimated arrival time, and may further specify that an additional notification will be sent once the mobile pickup unit has parked, as will be described in more detail below with respect to FIG. 10.

Figure 10:
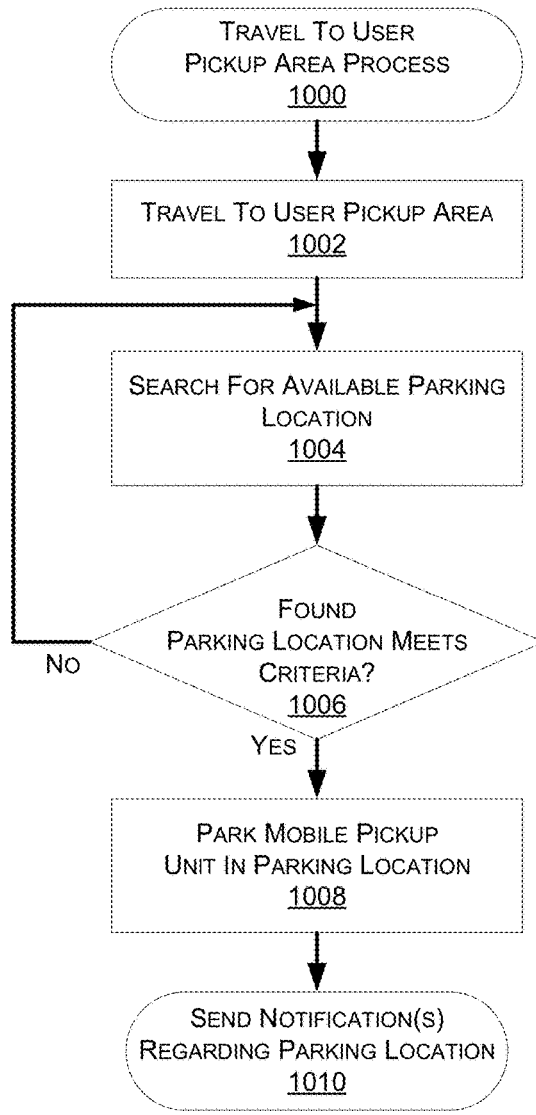
FIG. 10 is a flow diagram illustrating an example process for a mobile pickup unit travelling to a user pickup area, according to some implementations.

FIG. 10 is a flow diagram illustrating an example process 1000 for a mobile pickup unit traveling to a user pickup area. The example process begins with the mobile pickup unit navigating to the user pickup area, as in 1002. As described above, in various implementations, a mobile pickup unit may include or be transported by any type of mobile machine, for which the control may be manual (e.g., by a driver, etc.) or automated (e.g., directly or remotely controlled by an automated system, robotic, etc.). In implementations where the control is automated, an automated navigation system may be utilized for navigating the mobile pickup unit to the user pickup area. In various implementations, a central management system may provide travel instructions for the mobile pickup unit to travel to the user pickup area (e.g., where user travel areas overlap) and to park in a parking location within the user travel area.

Once the mobile pickup unit has traveled to the user pickup area, an available parking location is searched for, as in 1004. In various implementations, various techniques may be utilized for searching for a parking location. For example, a mobile pickup unit may be instructed to travel to a preferred location (e.g., an optimal location) that has been determined (e.g., at a center or centroid of a user pickup area, or according to an average of the coordinates of the user locations, etc.) and to begin a search for an available parking location that is as close as possible to the preferred location. In various implementations, the search instructions may include following a particular pattern (e.g., a spiral pattern outward, etc.), which may depend in part on the timing for finding the parking location. For example, if a mobile pickup unit is to be parked by a particular time (e.g., by 3:00 p.m.) but has arrived in a user pickup area early (e.g., 30 minutes early), the search instructions may include circling the area near the preferred location for a period of time (e.g., in case a parking location becomes available) before beginning a more aggressive search pattern to look for parking locations that may be further away from the preferred location. As another example, a mobile pickup unit may alternatively be directed to park in a first available parking location within a user pickup area (e.g., if there is only limited time remaining for finding a parking location, etc.).

In various implementations, other data may also be received and utilized for assisting with the search for a parking location (e.g., images and/or data from satellites, street cameras, other vehicles travelling in the area, users, etc.). Other data may also be received or accessed regarding parking locations in a given area (e.g., map and/or other data regarding public, private, and/or reserved parking locations indicating coordinates, fees, parking time limits, sizes, restrictions, statistics regarding how often the various parking locations are available and at what times of day, etc.). In various implementations, once an available parking location is found, data regarding the parking location and/or the search for the parking location, etc. may be recorded (e.g., by the mobile pickup unit and/or the central management system) and may be stored as part of a database or other collection of data regarding the given area, etc. Such data (e.g., regarding parking locations, statistical availability of parking locations, travel in the given area, etc.) may be collected from multiple mobile pickup units and/or other sources, and may be accessed and/or otherwise utilized to assist with future searches (e.g., by mobile pickup units) for parking locations in the given area, etc.

In various implementations, other vehicles and/or objects may be utilized to assist with holding a parking location for a mobile pickup unit. For example, another vehicle (e.g., automated or as controlled by an agent, user, etc.), may be in the user pickup area and may search for and park in a parking location shortly ahead of when the mobile pickup unit is expected to arrive so as to save the parking location for the mobile pickup unit. In such instances, notifications regarding the saved parking location may be sent (e.g., to the mobile pickup unit, to a central management system, to users, etc.) indicating the coordinates of the saved parking location where the mobile pickup unit will be parked.

Once an available parking location is found, a determination is made if the parking location meets certain criteria, as in 1006. In various implementations, the criteria may be based at least in part on factors such as the size of the mobile pickup unit, the required orientation of the mobile pickup unit while parked (e.g., leaving space for users to safely retrieve items), an amount of time that the mobile pickup unit will be required to park for, etc. For example, if a mobile pickup unit will be required to park from 3:00 p.m. to 8:00 p.m., the criteria may require that the mobile pickup unit be able to park for that time period. In some implementations, some parking locations that are located throughout a region may be reserved for use by the mobile pickup units and/or other commercial vehicles (e.g., during certain times of day, etc.) In some instances, a mobile pickup unit may park in a first parking location during a first portion of a time period, and then may move to a second parking location during a second portion of a time period (e.g., due to no parking locations currently being available for the full time period). In various implementations, certain sensors of the mobile pickup unit may be utilized to read parking signs or otherwise obtain information regarding a parking location (e.g., for determining maximum parking time limits, the size of the parking location, etc.). If the found parking location does not meet the criteria, the process returns to block 1004, where the search continues for another available parking location.

If the found parking location does meet the criteria, the mobile pickup unit is parked in the parking location, as in

1008. In various implementations, the orientation in which the mobile pickup unit is parked may depend on various factors. For example, if the mobile pickup unit and/or associated storage compartments only have access points for users on one side of the mobile pickup unit, it may be desirable for the accessible side of the mobile pickup unit to be facing a sidewalk or other area where a user may safely stand to retrieve an ordered item. In alternative implementations, a mobile pickup unit may provide access for users on multiple sides of the mobile pickup unit which may allow greater flexibility for the parking orientation of the mobile pickup unit. For example, a storage compartment may have doors on opposite ends or otherwise be accessible from different sides of the mobile pickup unit so as to enable a user to retrieve a stored item from any one of the different sides of the mobile pickup unit. In various implementations, a pickup unit function may be executed to enable the user to retrieve the ordered item. For example, the pickup unit function may include unlocking the storage compartment in which the item is stored and/or the mobile pickup unit 200 may have an ability to partially or fully rotate at least a portion of the mobile pickup unit over a parked base, so as to present an access point in a desired direction regardless of how the mobile pickup unit 200 is initially parked. As another example, a robotic mechanism (e.g., a robotic arm) may be provided that is able to present an item to a user on different sides of the mobile pickup unit 200 as part of a pickup unit function to enable the user to retrieve the ordered item.

Once the mobile pickup unit has parked, notifications regarding the parking location may be sent, as in 1010. In various implementations, such notifications may be sent from the mobile pickup unit to a remote computing resource (e.g., a central management system), or directly to users, etc. For example, the mobile pickup unit may send a notification (e.g., to the central management system and/or directly to a user) that indicates that the mobile pickup unit has parked at a parking location within the user pickup area. As another example, a central management system may determine when a mobile pickup unit is parked within a user pickup area (e.g., according to a notification that is received from the mobile pickup unit or as otherwise determined from GPS or other sensor data, etc.) and may send a notification to a user that indicates the parking location where the mobile pickup unit is parked.

In various implementations, a user may receive such a notification (e.g., from a central management system and/or directly from a mobile pickup unit, etc.) which indicates the parking location, as well as other information that may be helpful or needed by the user for retrieving the ordered item. For example, the received notification may also include an access code for retrieving the ordered item. In various implementations, GPS or other location signals may be utilized to determine the coordinates of the mobile pickup unit which may be provided to a user. In various implementations, users may be able to view a map (e.g., on a website, mobile application, etc.) that shows and updates the parking location or other current position of the mobile pickup unit. In an instance where a mobile pickup unit is to park in a first parking location during a first portion of a time period, and then move to a second parking location during a second portion of a time period (e.g., due to no parking locations currently being available for the full time period), corresponding notifications may be sent to users (e.g., indicating when the mobile pickup unit is to move, etc.).

Figure 11:
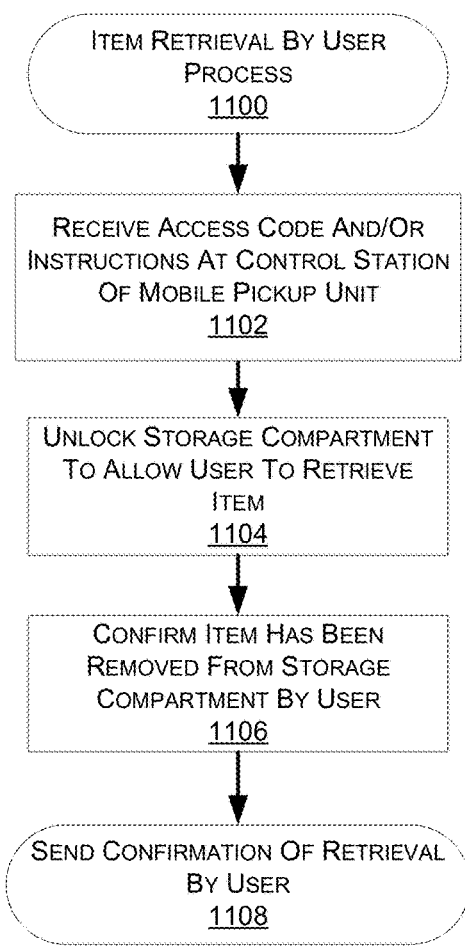
FIG. 11 is a flow diagram illustrating an example process for a user retrieving an item from a mobile pickup unit, according to some implementations.

FIG. 11 is a flow diagram illustrating an example process 1100 for a user retrieving an item from a mobile pickup unit. The example process begins with the receipt of an input (e.g., an access code and/or instructions) at a control station of the mobile pickup unit, as in 1102. In various implementations, the input may indicate that the user has arrived at the mobile pickup unit to retrieve the ordered item that is stored in a storage compartment of the mobile pickup unit. For example, a user may enter an access code as part of a pickup unit activity to gain access to a storage compartment of the mobile pickup unit. In various implementations, an access code may include a unique identifier, such as a PIN that may be input by the user on a user interface of the control station and/or scanning of a bar code, QR code, etc. The access code may have been provided to the user as part of a message indicating that the item is available to be retrieved from the mobile pickup unit. In an alternative implementation, rather than the user providing an access code at the control station, the control station may receive an input of an access code or other instructions from a remote computing resource for unlocking a storage compartment. For example, a mobile pickup unit may be made smaller and less expensive by including little or no user interface. In such an implementation, a user may be instructed to perform a pickup unit activity that includes responding to a text message or performing another action with their cell phone or other device when they are at the mobile pickup unit in order to have an access code or other instructions sent from a remote computing resource to the control station of the mobile pickup unit for providing access to the storage compartment.

Once the access code or other instructions are received, the storage compartment associated with the access code or other instructions is unlocked so as to allow the user to retrieve the item, as in 1104. Once the user has retrieved the item, a confirmation is made that the item has been removed from the storage compartment by the user, as in 1106. For example, the confirmation may include determining whether a closed-door notification has been received, as indicating that the user has closed the door of the storage compartment after retrieving the item. In addition, if an image capture device 273 within the storage compartment has been activated, video or images captured by the image capture device 273 may be reviewed or analyzed to confirm that the user has removed the item from the storage compartment. In addition, or as an alternative thereto, a presence detection sensor 271 and/or motion sensor 272 within the storage compartment may be queried to confirm that the item has been removed from the storage compartment by the user.

Once a confirmation has been made that the item has been removed from the storage compartment by the user, the control station of the mobile pickup unit sends a confirmation of the retrieval by the user to a remote computing resource, as in 1108. The confirmation of the retrieval by the user may also include additional information such as the date and time of the retrieval. In various implementations, a message may be sent to the user confirming the retrieval, as a safety measure to ensure that it was the user or a user's authorized agent and not another party that retrieved the item from the storage compartment.

Figure 12:
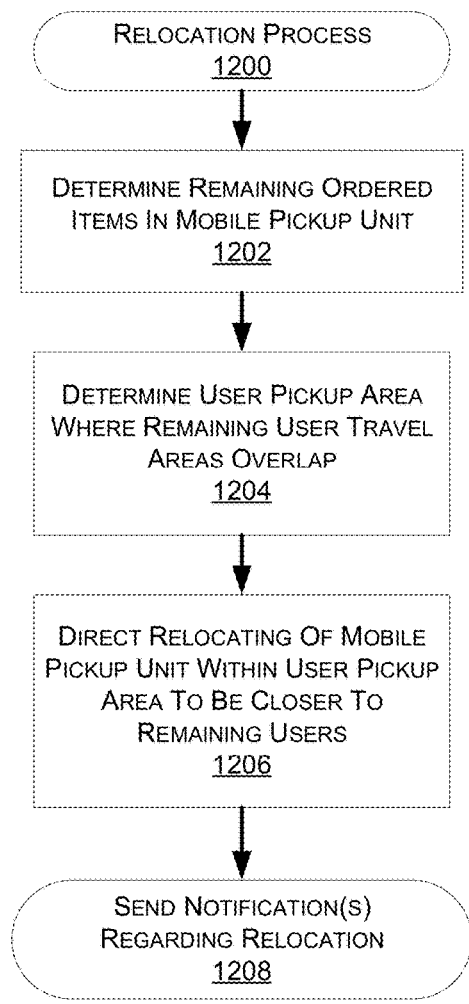
FIG. 12 is a flow diagram illustrating an example process for relocating a mobile pickup unit, according to some implementations.

FIG. 12 is a flow diagram illustrating an example process 1200 for relocating a mobile pickup unit. The example process begins with determining remaining ordered items in the mobile pickup unit, as in 1202. For example, at the end of a time window (e.g., 3:00 p.m. to 8:00 p.m.), or otherwise after a certain period of time, a determination may be made as to which ordered items have not yet been retrieved by users from the mobile pickup unit. Once the remaining ordered items have been determined, a user pickup area is determined where the remaining user travel areas overlap, as in 1204.

Once the user pickup area has been determined, the mobile pickup unit is directed to relocate within the determined user pickup area to a new parking location that is closer to the remaining users, as in 1206. Once the mobile pickup unit has been directed to relocate, notifications may be sent regarding the relocation, as in 1208. For example, a notification from the mobile pickup unit (e.g., as sent to a central management system and/or directly to a user, etc.) may indicate that the mobile pickup unit is being relocated to be closer to the remaining users. As described above with respect to FIG. 10, a notification may also or alternatively be sent when the mobile pickup unit has arrived and parked in a parking location in the user pickup area.

Figure 13:
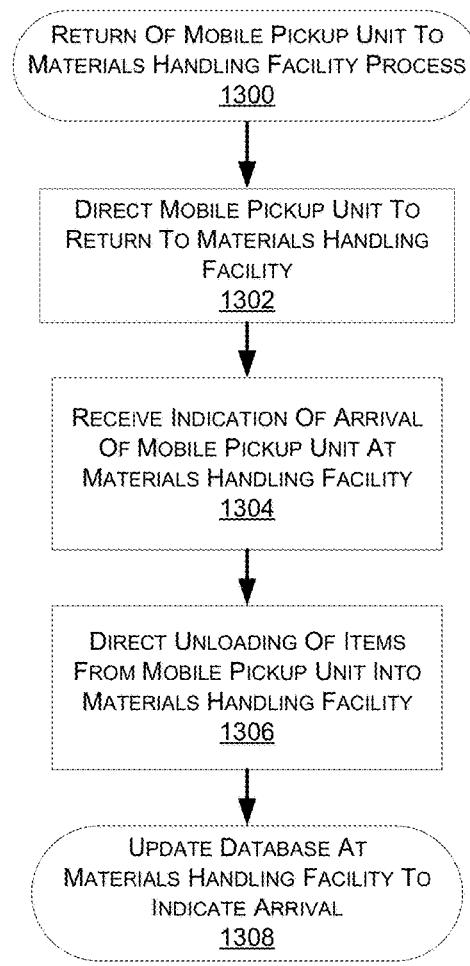
FIG. 13 is a flow diagram illustrating an example process for a mobile pickup unit returning to a materials handling facility, according to some implementations.

FIG. 13 is a flow diagram illustrating an example process 1300 for a mobile pickup unit returning to a materials handling facility. The example process begins with directing the mobile pickup unit to return to a materials handling facility, as in 1302. For example, a mobile pickup unit may be instructed to return to a materials handling facility once a time window has expired or if all of the ordered items that the mobile pickup unit was carrying have been retrieved by users, etc. In some instances, a mobile pickup unit may travel out to user pickup areas and return to a materials handling facility multiple times during a given day (e.g., with the mobile pickup unit returning each time all of the carried items are retrieved by users, etc.) After the mobile pickup unit has been directed to return to the materials handling facility, an indication is received of when the mobile pickup unit has arrived at the materials handling facility, as in 1304. For example, GPS tracking, visual identification, etc. may be utilized to determine when a mobile pickup unit has arrived.

After the mobile pickup unit has arrived at the materials handling facility, any items that are to be removed are unloaded from the mobile pickup unit into the materials handling facility, as in 1306. In various implementations, the items to be unloaded may include ordered items that were not retrieved by users and/or returned items that users placed in the mobile pickup unit as part of a return process, etc. In some instances, a user may have intentionally left an ordered item in a storage compartment as part of a return process. In some instances, a user may not have been able to travel to the mobile pickup unit to retrieve an ordered item within the provided time window (e.g., from 3:00 p.m. to 8:00 p.m.), in which case the ordered item may be left in the mobile pickup unit (e.g., if the mobile pickup unit is scheduled to travel to a similar user pickup area the next day where the user may retrieve the item).

In various implementations, the items in the mobile pickup unit may be removed and processed in various ways. For example, the items may be individually removed (e.g., including scanning of identifiers for the items and/or storage compartments), or an entire section of storage compartments or areas may be removed from the mobile pickup unit for further processing inside the materials handling facility, etc. As the items are unloaded, a database at the materials handling facility is updated to indicate the physical arrival of the received items, as in 1308. Such updated data may be utilized for various purposes (e.g., initiating a refund process for a user based on a returned item having been received, etc.).

FIG. 14 is a block diagram illustrating an example computer system 1400 configured to implement one or more of the systems or processes described herein. In various examples, the block diagram may be illustrative of one or more aspects of the control station 201 (FIG. 2), a control system for a mobile machine that is part of or otherwise utilized for transporting a mobile pickup unit 200, the electronic device 406 (FIG. 4), and/or the remote computing resource(s) 410 (FIG. 4), etc. In some implementations, it is contemplated that components of a mobile pickup unit (e.g., user interface, command component, storage compartment management component, control station, navigation control, etc.) may be implemented using a single instance of the computer system 1400, while in other implementations, multiple such systems or multiple nodes making up the computer system 1400 may be configured to host different portions, components or instances of a mobile pickup unit. For example, in one implementation, some data sources or services (e.g., for operating the control station 201, etc.) may be implemented via one or more nodes of the computer system 1400 that are distinct from those nodes implementing other data sources or services (e.g., for operating a mobile machine and/or navigation system that is part of or otherwise utilized for transporting the mobile pickup unit 200, etc.). In some implementations, a given node may implement the functionality of more than one component of a mobile pickup unit.

In the illustrated implementation, the computer system 1400 includes one or more processors 1402 coupled to a non-transitory computer readable storage medium 1420 (e.g., a memory) via an input/output (I/O) interface 1410. The computer system 1400 may also include a network interface 1416 and one or more input/output devices 1418. As part of a control system (e.g., for a mobile machine that is part of or otherwise utilized for transporting a mobile pickup unit 200, etc.), the computer system 1400 may further include a propulsion controller 1404 (e.g., for controlling one or more motors, engines, etc.), a power controller 1406 (e.g., for controlling, monitoring and/or regulating the use and charging of the power modules and/or fuel control, etc.), a navigation system 1408, and/or an item engagement/repositioning mechanism controller 1412, etc.

In various implementations, the computer system 1400 may be a uniprocessor system including one processor 1402, or a multiprocessor system including several processors 1402 (e.g., two, four, eight, or another suitable number). The processor(s) 1402 may be any suitable processor capable of executing instructions. For example, in various implementations, the processor(s) 1402 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1402 may commonly, but not necessarily, implement the same ISA.

The non-transitory computer readable storage medium 1420 may be configured to store executable instructions, data, and/or data items accessible by the processor(s) 1402. In various implementations, the non-transitory computer readable storage medium 1420 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 1420 as program instructions 1422, data storage 1424 and travel path data 1426 (e.g., including data regarding a user travel area, etc.), respectively. In other implementations, program instructions, data, and/or travel paths may be received, sent, or stored upon different types of computer-accessible media, such as non-transitory media, or on similar media separate from the non-transitory computer readable storage medium 1420 or the computer system 1400. Generally speaking, a non-transitory, computer readable storage medium may include storage media or memory media such as magnetic or optical media, e.g., disk or CD/DVD-ROM, coupled to the computer system 1400 via the I/O interface 1410. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1416.

In one implementation, the I/O interface 1410 may be configured to coordinate I/O traffic between the processor(s) 1402, the non-transitory computer readable storage medium 1420, and any peripheral devices, the network interface or other peripheral interfaces, such as input/output devices 1418. In some implementations, the I/O interface 1410 may perform any necessary protocol, timing or other data transformations to convert data signals from one component (e.g., non-transitory computer readable storage medium 1420) into a format suitable for use by another component (e.g., processor(s) 1402). In some implementations, the I/O interface 1410 may include support for devices attached through various types of peripheral buses, such as a variant of the Peripheral Component Interconnect (PCI) bus standard or the Universal Serial Bus (USB) standard, for example. In some implementations, the function of the I/O interface 1410 may be split into two or more separate components, such as a north bridge and a south bridge, for example. Additionally, in some implementations, some or all of the functionality of the I/O interface 1410, such as an interface to the non-transitory computer readable storage medium 1420, may be incorporated directly into the processor(s) 1402.

With respect to navigation functions, the propulsion controller 1404 communicates with the navigation system 1408 (e.g., for adjusting the power of the propulsion system of the mobile pickup unit 200 of FIG. 2 to navigate the mobile pickup unit along a determined travel path, etc.). The navigation system 1408 may include a global positioning system (GPS), indoor positioning system (IPS), or other similar system and/or sensors that can be used to navigate the mobile pickup unit 200 to and/or from a location. The item engagement/repositioning mechanism controller 1412 communicates with mechanisms used to engage and/or reposition items. For example, if an item within a mobile pickup unit is to be repositioned (e.g., moved to or removed from a storage compartment, etc.), the controller 1412 may control a robotic arm or other mechanism for repositioning the item. As another example, if the mobile pickup unit is to pick up or drop off an item at a particular location, the controller 1412 may provide an instruction (e.g., to a mechanism and/or a motor etc. that controls a mechanism) to engage or release the item.

The network interface 1416 may be configured to allow data to be exchanged between the computer system 1400, other nodes or devices attached to a network, such as other computer systems (e.g., remote computing resources 410), and/or with mobile pickup unit computer systems of other mobile pickup units, etc. For example, the network interface 1416 may enable wireless communication between the mobile pickup unit 200 and the central management system 426 that is implemented on one or more of the remote computing resources 410. As another example, the network interface 1416 may utilize the wireless antennas 241, 243, 231, 245, 247 to allow interaction and interface between the central management system 426 and the command component of the control station 201 and the storage compartment management component of each connected storage compartment module 203, 205, 207, 209. For wireless communication, an antenna of a mobile pickup unit or other communication components may be utilized. As another example, the network interface 1416 may enable wireless communication between numerous mobile pickup units. In various implementations, the network interface 1416 may support communication via wireless general data networks, such as a Wi-Fi network. For example, the network interface 1416 may support communication via telecommunications networks such as cellular communication networks, satellite networks, and the like.

In some implementations, with respect to the operations of the control station 201 etc., the input/output devices 1418 may include one or more display terminals, keyboards, keypads, touchpads, scanning devices, voice or optical recognition devices, or any other devices suitable for entering or retrieving data by one or more computer systems 1400. Multiple input/output devices 1418, such as a user interface 211, may be present in the computer system 1400 or may be distributed on various nodes of the computer system 1400. In some implementations, similar input/output devices may be separate from the computer system 1400 and may interact with one or more nodes of the computer system 1400 through a wired or wireless connection, such as over the network interface 1416. For example, the computer systems of the storage compartment modules 203, 205, 207, 209 and/or the locking mechanisms of those storage compartment modules may communicate with the computer system 1400 as input/output devices 1418 over wired or wireless network interface 1416.

In some implementations, with respect to the navigation, etc. of the mobile pickup unit 200, the input/output devices 1418 may include one or more displays, imaging sensors, thermal sensors, infrared sensors, time of travel sensors, accelerometers, pressure sensors, weather sensors, locator devices, etc. Multiple such input/output devices 1418 may be present and controlled by the computer system 1400. One or more of these sensors (e.g., imaging sensors, etc.) may be utilized to assist with navigating the mobile pickup unit (e.g., including the avoidance of other vehicles or obstacles during travel, etc.). In various implementations, such sensors may also be utilized for assisting with parking and other activities of a mobile pickup unit. For example, a sensor (e.g., an imaging sensor, a proximity sensor, etc.) may be utilized to determine if a parking location is currently occupied by another vehicle, etc.).

As shown in FIG. 14, the memory 1420 may include program instructions 1422 that may be configured to implement the example processes and/or sub-processes described herein. In various implementations, the program instructions 1422 may be configured to implement a mobile pickup unit data storage 1424, which may comprise various tables, databases and/or other data structures accessible by the program instructions 1422. In some implementations, with respect to the operations of the control station 201 etc., the program instructions 1422 may include various software modules configured to implement a user interface 211, security, locking and unlocking of storage compartments, management of the mobile pickup unit, etc. The data storage 1424 may include various data representing presence or absence of items contained in various storage compartments, access information for various storage compartments and/or other parameter values. The data storage 1424 may also include one or more data stores for maintaining data representing available storage capacity, item deliveries, retrievals, returns, hold orders, partial orders, transfer container locations, schedule data for mobile pickup units, and other information utilized by the central management system and/or mobile pickup units. In some implementations, with respect to the mobile pickup unit navigation, etc., the data storage 1424 and/or travel path data 1426 may include various data stores for maintaining data items that may be provided for representing and/or determining travel path instructions, receiving items, travelling, navigating to user pickup areas, identifying locations for parking, etc.

In various implementations, the parameter values and other data illustrated herein as being included in one or more data stores may be combined with other information not described or may be partitioned differently into more, fewer, or different data structures. In some implementations, data stores used in the central management system and/or in a mobile pickup unit and/or in components or portions thereof, may be physically located in one memory or may be distributed among two or more memories. These memories may be part of a single computer system or they may be distributed among two or more computer systems, such as two computer systems connected by a wired or wireless local area network, or through the Internet, in different implementations. Similarly, in other implementations, different software modules and data stores may make up a mobile pickup unit system and/or any of the various components thereof described herein.

Those skilled in the art will appreciate that the computer system 1400 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The computer system 1400 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated computer system 1400. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the computer system 1400 may be transmitted to the computer system 1400 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other mobile pickup unit computer system configurations.

While certain functional components of the example mobile pickup unit 200 are discussed herein as part of the mobile pickup unit 200, in other implementations, one or more of the functional components may be distributed and/or implemented as part of the central management system 426. For example, one or more of the aspects of the program instructions 1422 may be implemented as part of the central management system 426.

Figure 15:
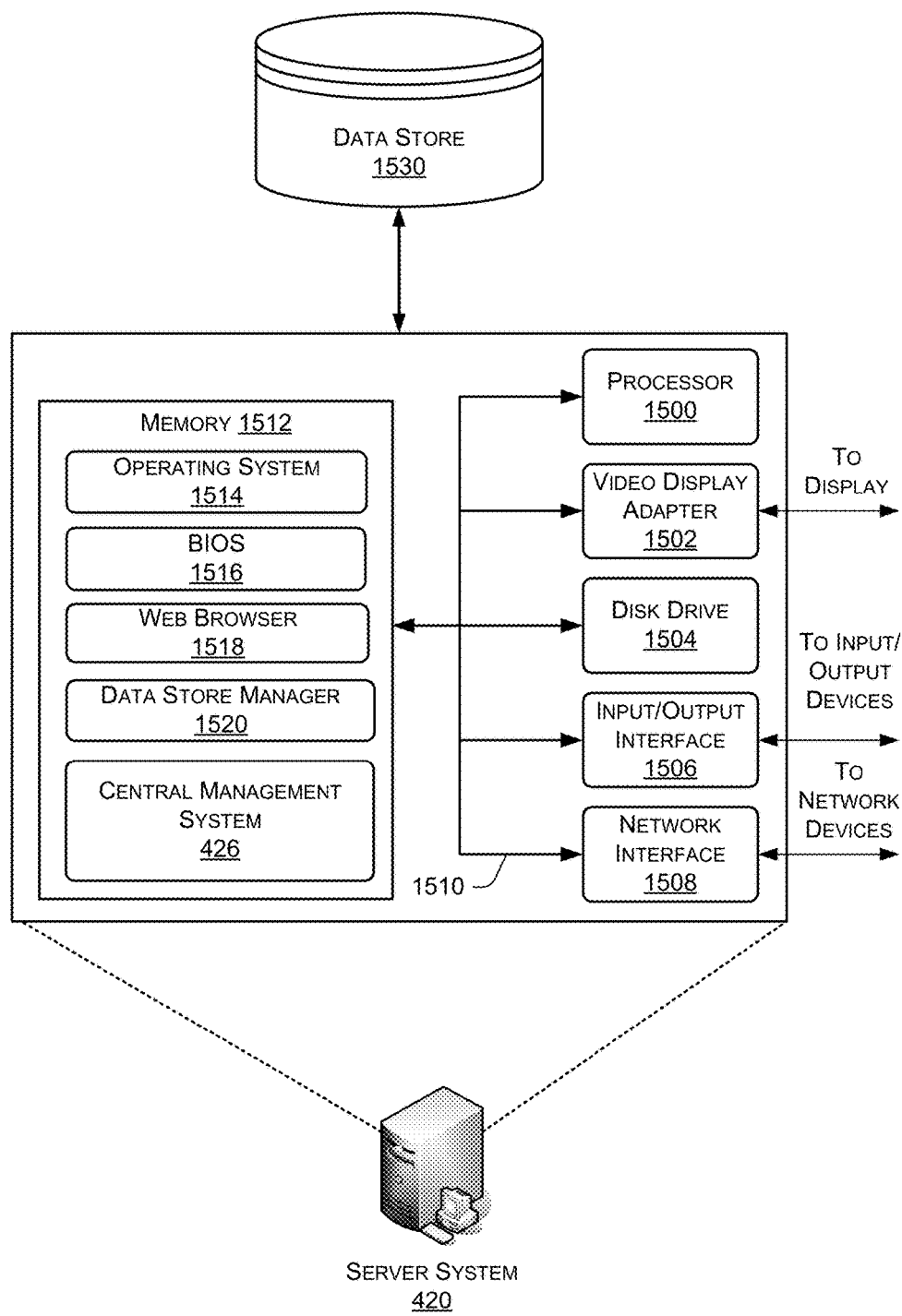
FIG. 15 is a block diagram of an illustrative implementation of a server system that may be used with various implementations.

FIG. 15 is a block diagram of an illustrative implementation of a server system, such as the server system 420, which may be used in the implementations described herein. The server system 420 may include a processor 1500, such as one or more redundant processors, a video display adapter 1502, a disk drive 1504, an input/output interface 1506, a network interface 1508, and a memory 1512. The processor 1500, the video display adapter 1502, the disk drive 1504, the input/output interface 1506, the network interface 1508, and the memory 1512 may be communicatively coupled to each other by a communication bus 1510.

The video display adapter 1502 provides display signals to a local display (not shown in FIG. 15) permitting an agent of the server system 420 to monitor and configure operation of the server system 420 and/or to provide information (e.g., regarding the operations of mobile pickup units 200, etc.). The input/output interface 1506 likewise communicates with external input/output devices not shown in FIG. 15, such as a mouse, keyboard, scanner, or other input and output devices that can be operated by an agent of the server system 420. The network interface 1508 includes hardware, software, or any combination thereof, to communicate with other computing devices. For example, the network interface 1508 may be configured to provide communications between the server system 420 and other computing devices, such as that of a mobile pickup unit 200, central management system 426, etc., via a network.

The memory 1512 generally comprises random access memory (RAM), read-only memory (ROM), flash memory, and/or other volatile or permanent memory. The memory 1512 is shown storing an operating system 1514 for controlling the operation of the server system 420. A binary input/output system (BIOS) 1516 for controlling the low-level operation of the server system 420 is also stored in the memory 1512.

The memory 1512 additionally stores program code and data for providing network services to the mobile pickup unit 200, central management system 426, etc. Accordingly, the memory 1512 may store a browser application 1518. The browser application 1518 comprises computer executable instructions, that, when executed by the processor 1500 generate or otherwise obtain configurable markup documents such as Web pages. The browser application 1518 communicates with a data store manager application 1520 to facilitate data exchange between the data store 1530 and the mobile pickup units 200, the central management system 426, etc.

As used herein, the term "data store" refers to any device or combination of devices capable of storing, accessing, and retrieving data, which may include any combination and number of data servers, databases, data storage devices and data storage media, in any standard, distributed or clustered environment. The server system 420 can include any appropriate hardware and software for integrating with the data store 1530 as needed to execute aspects of one or more applications for a mobile pickup unit 200, central management system 426, etc.

The data store 1530 can include several separate data tables, databases or other data storage mechanisms and media for storing data relating to a particular aspect. For example, the illustrated data store 1530 may include mechanisms for maintaining information related to operations, inventory, maps, GPS data, mobile pickup units, user pickup areas, parking locations, associated travel paths, etc., which can be used to generate and deliver information to a mobile pickup unit 200, central management system 426, agents, etc. It should be understood that there may be additional aspects that can be stored in the data store 1530 and that additional data stores beyond the one illustrated may be included. The data store 1530 is operable, through logic associated therewith, to receive instructions from the server system 420 and obtain, update or otherwise process data in response thereto.

The memory 1512 may also include the central management system 426, discussed above. The central management system 426 may be executable by the processor 1500 to implement one or more of the functions of the server system 420. In one implementation, the central management system 426 may represent instructions embodied in one or more software programs stored in the memory 1512. In another implementation, the central management system 426 can represent hardware, software instructions, or a combination thereof.

The server system 420, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction in FIG. 15 should be taken as being illustrative in nature and not limiting to the scope of the disclosure.

Those skilled in the art will appreciate that in some implementations the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system to transport ordered items for retrieval by users, the system comprising:
   a mobile pickup unit comprising:
      a plurality of storage compartments, each storage compartment having a locking mechanism; and
      a control station configured to control each of the locking mechanisms; and
   a computing system, comprising:
      one or more processors; and
      a memory coupled to the one or more processors and storing program instructions that when executed by the one or more processors cause the one or more processors to at least:
         receive orders for items that are to be retrieved by a plurality of users from the mobile pickup unit;
         receive travel-related data that indicates at least one of a maximum time or a maximum distance for each user to travel from a respective user location to the mobile pickup unit;
         determine a user travel area for each user that is defined at least in part by the travel-related data;
         determine a first user pickup area where the user travel areas overlap;
         provide travel instructions for the mobile pickup unit to travel to the first user pickup area and to park in a first parking location in the first user pickup area;
         after at least some of the users have retrieved their ordered items, determine which users of the plurality of users are remaining users who have not yet retrieved their ordered items;
         determine a second user pickup area where the user travel areas for the remaining users overlap; and
         provide travel instructions for the mobile pickup unit to relocate from the first parking location to a second parking location within the second user pickup area that is closer to each of the remaining user locations than the first parking location.

2. The system of claim 1, wherein the program instructions when executed by the one or more processors further cause the one or more processors to provide instructions for placing the ordered items in storage compartments of the mobile pickup unit while the mobile pickup unit is at a materials handling facility before the mobile pickup unit travels to the first user pickup area.

3. The system of claim 1, wherein the mobile pickup unit further comprises a mobile machine that transports the mobile pickup unit and that is at least one of manually controlled or automated.

4. The system of claim 1, wherein the program instructions when executed by the one or more processors further cause the one or more processors to determine when the mobile pickup unit is parked within each of the first and second user pickup areas and to send respective first and second notifications that indicate the first and second parking locations where the mobile pickup unit is parked.

5. The system of claim 1, wherein the program instructions when executed by the one or more processors further cause the one or more processors to determine a time window during which the mobile pickup unit will be parked in the first parking location in the first user pickup area.

6. The system of claim 5, wherein the program instructions when executed by the one or more processors further cause the one or more processors to make a determination that at the end of the time window the mobile pickup unit will be
relocated to be closer to remaining users who have not yet retrieved ordered items from the mobile pickup unit.

7. A mobile pickup unit comprising:
a plurality of storage compartments; and
a computing system comprising:
one or more processors; and
a memory coupled to the one or more processors and storing program instructions that when executed by the one or more processors cause the one or more processors to at least:
receive instructions to park in a first user pickup area where a plurality of user travel areas overlap, wherein each user travel area corresponds to a travel limit for a respective user for traveling from a respective user location to retrieve an ordered item that is stored in a storage compartment of the mobile pickup unit;
send a notification that indicates that the mobile pickup unit has parked at a first parking location within the first user pickup area;
receive an input that indicates a first user has arrived at the mobile pickup unit to retrieve a first item that is stored in a first storage compartment;
execute a pickup unit function to enable the first user to retrieve the first item while the mobile pickup unit is parked at the first parking location; and
after the first user has retrieved the first item and before all of a plurality of users have retrieved their ordered items, receive instructions to relocate from the first parking location to a second parking location within a second user pickup area that is determined based at least in part on:
a determination of which users of the plurality of users are remaining users who have not yet retrieved their ordered items; and
an overlap of user travel areas; and
wherein the second user pickup area is closer to user locations of each of the remaining users than the first parking location.

8. The mobile pickup unit of claim 7, wherein the pickup unit function comprises unlocking the first storage compartment.

9. The mobile pickup unit of claim 7, wherein the first storage compartment is accessible from first and second sides, respectively, of the mobile pickup unit, so as to enable the first user to retrieve the first item from either the first or second side of the mobile pickup unit.

10. The mobile pickup unit of claim 7, further comprising a mobile machine to transport the mobile pickup unit, wherein the mobile machine comprises at least one of a car, truck, watercraft, aircraft, mobile drive unit, mobile vehicle or unmanned aerial vehicle.

11. The mobile pickup unit of claim 10, wherein control of the mobile machine is automated.

12. The mobile pickup unit of claim 7, further comprising an imaging sensor, wherein the program instructions when executed by the one or more processors further cause the one or more processors to utilize the imaging sensor to determine if a parking location is currently occupied by another vehicle.

13. The mobile pickup unit of claim 7, further comprising a locator device that is configured to assist a user with locating the mobile pickup unit.

14. A system to transport items, the system comprising:
a mobile pickup unit, comprising:
a plurality of storage compartments for storing items as part of pickup unit activities which include at least one of retrieving an item from a storage compartment or placing an item in a storage compartment; and
a computing system, comprising:
one or more processors; and
a memory coupled to the one or more processors and storing program instructions that when executed by the one or more processors cause the one or more processors to at least:
receive travel-related data indicating a travel limit for each user of a plurality of users for travelling from a respective user location to a mobile pickup unit to perform a pickup unit activity;
determine a first user pickup area in which the mobile pickup unit is to be parked, wherein the mobile pickup unit is to be parked at a first parking location within the first user pickup area to enable the plurality of users to travel to the mobile pickup unit without exceeding the travel limits indicated by the travel-related data;
after at least some of the users have performed pickup unit activities, determine which users of the plurality of users are remaining users who have not yet performed pickup unit activities; and
determine a second user pickup area in which the mobile pickup unit is to be parked, wherein the mobile pickup unit is to be parked at a second parking location within the second user pickup area that is closer to the remaining user locations than the first parking location and that enables the remaining users to travel to the mobile pickup unit without exceeding the travel limits indicated by the travel-related data.

15. The system of claim 14, wherein the pickup unit activity includes at least one of retrieving an ordered item from the mobile pickup unit or placing an item in a storage compartment of the mobile pickup unit as part of a return process for the item.

16. The system of claim 14, wherein the program instructions when executed by the one or more processors further cause the one or more processors to provide an access code to a first user, when a first pickup unit activity includes the first user entering the access code at the mobile pickup unit to gain access to a first storage compartment of the mobile pickup unit.

17. The system of claim 14, wherein the program instructions when executed by the one or more processors further cause the one or more processors to provide information regarding the second user pickup area to the mobile pickup unit to enable the mobile pickup unit to autonomously navigate to the second user pickup area.

18. The system of claim 14, wherein the program instructions when executed by the one or more processors further cause the one or more processors to determine a preferred location within the second user pickup area and providing instructions for the mobile pickup unit to park as close as possible to the preferred location.

19. The system of claim 18, wherein the preferred location is determined according to at least one of a center of the second user pickup area or an average of coordinates of remaining user locations.

20. The system of claim 14, wherein the program instructions when executed by the one or more processors further cause the one or more processors to send notifications to the remaining users that include information regarding the second parking location where the mobile pickup unit is parked.

* * * * *